United States Patent Office 3,541,349
Patented Nov. 17, 1970

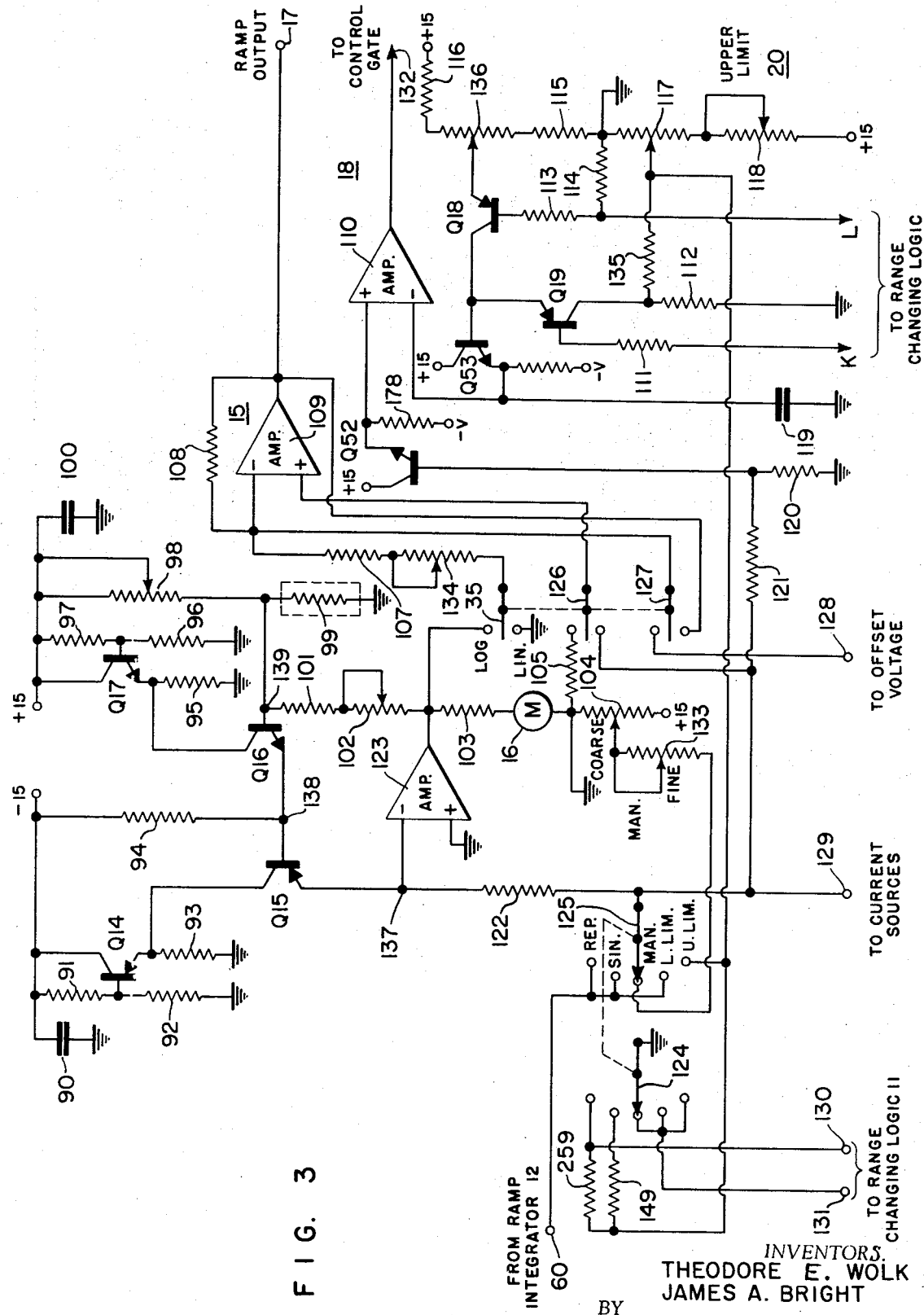

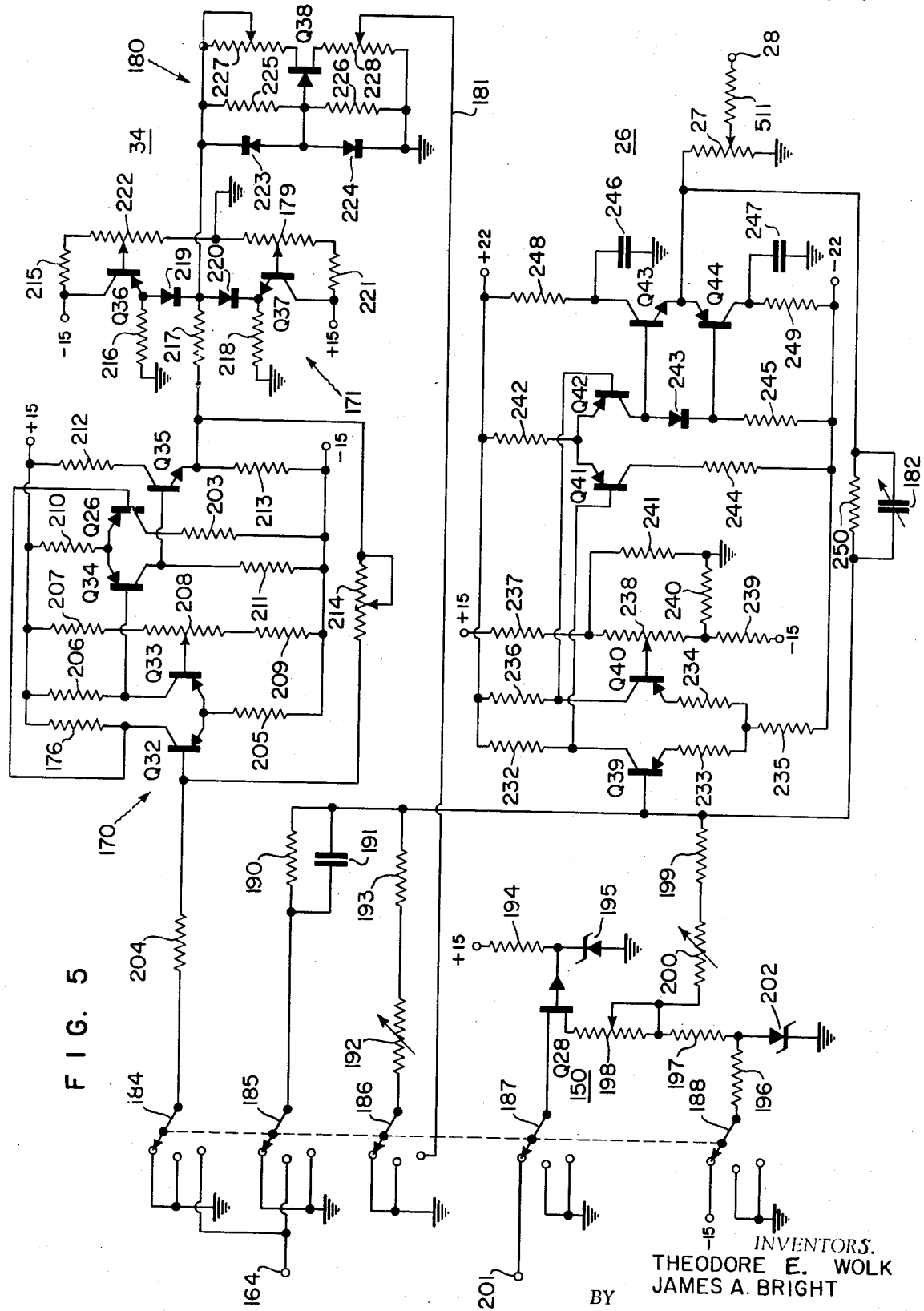

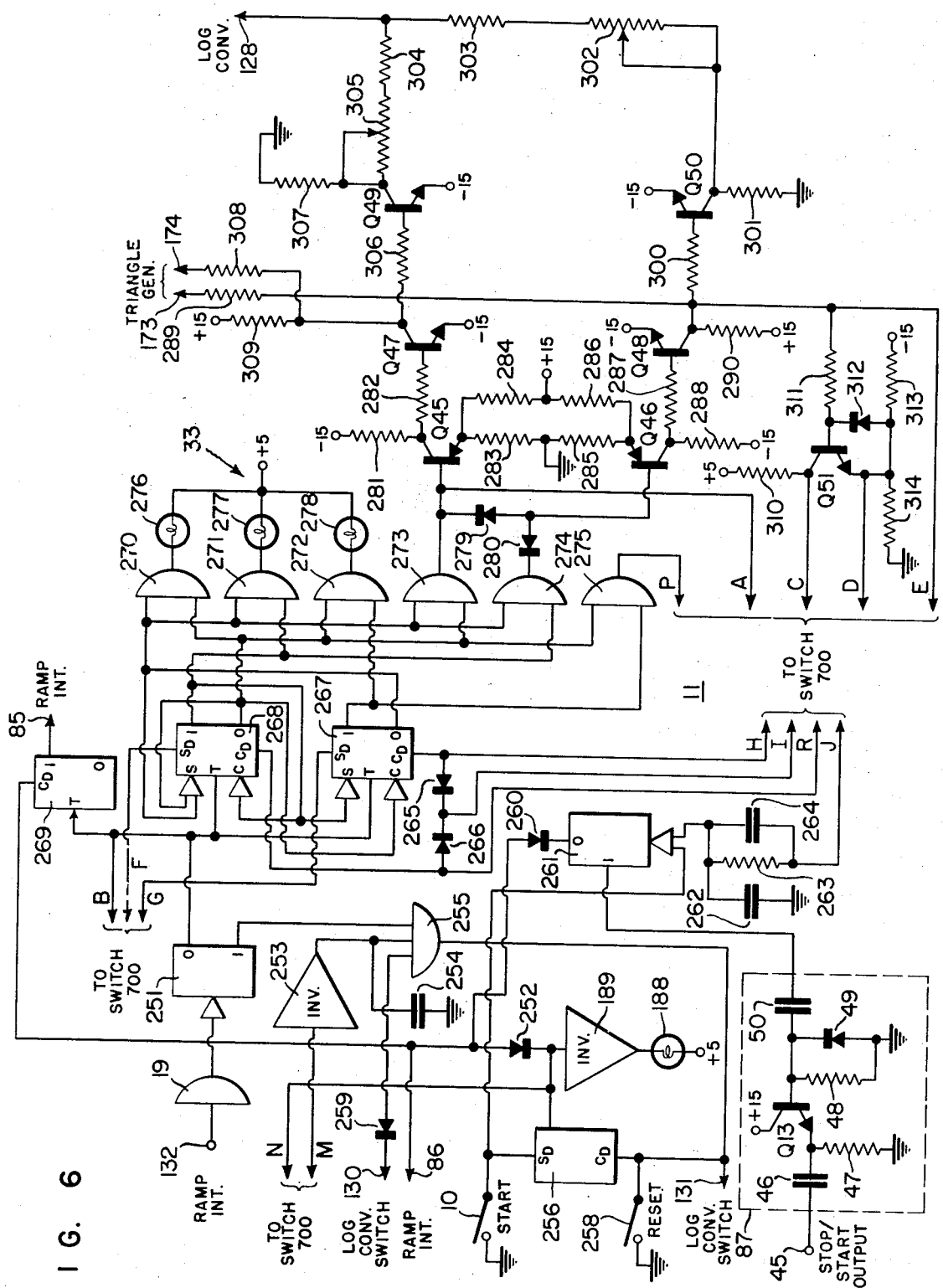

3,541,349
VARIABLE FREQUENCY MULTIPLE MODE FUNCTION SIGNAL GENERATOR
James A. Bright, Denver, and Theodore E. Wolk, Littleton, Colo., assignors to Honeywell Inc., Minneapolis, Minn., a corporation of Delaware
Filed Feb. 5, 1968, Ser. No. 702,885
Int. Cl. H03k 4/08; G06g 7/12
U.S. Cl. 307—229                                8 Claims

ABSTRACT OF THE DISCLOSURE

There is disclosed an auto sweep oscillator which is a stable, wide range, low distortion function generator suitable for use as a laboratory or production test frequency and wave form source. The output wave forms supplied by the function generator are in the form, selectively, of sinewaves, squarewaves or triangular waves. These waveforms have relatively flat frequency characteristics over the range from 0.01 Hz. to 100 kHz. The generator can be operated either manually or automatically. In automatic operation, up to three ranges can be automatically switched, thereby enabling an overall frequency range of one million to one. The sweep ramp is selectively linear or logarithmic with respect to time. The sweep time is selectively variable between 10 and 1000 seconds per range, with a total sweep time range up to 3000 seconds.

---

There are many applications in the electronics industry wherein signal generators or oscillators are useful. Signal generators may be utilized as laboratory and/or production test-frequency and waveform sources. Many oscillators are known in the art for providing various waveforms. However, for the most part, these oscillators are limited in the range of frequency response as well as the operating characteristics thereof. Moreover, linear or log sweep time oscillator devices are available. However, the combination of this type of operation into a single unit is rare and then only in extremely complicated and complex devices.

The subject invention relates to an auto sweep oscillator which is a stable, wide range, low distortion function generator for use as a laboratory or production test frequency and waveform source. The output waveforms supplied by the oscillator are a sinewave, a squarewave, and a triangular wave. These waveforms have relatively flat frequency responses over the rnge of 0.01 Hz. to 100 kHz. The oscillator can be operated either manually or automatically. In automatic operation, up to three ranges can be automatically switched thereby enabling a maximum frequency range of one million to one. The sweep can be either linear or logarithmic with respect to time. These sweep operations are alternative and are accomplished with a minimal amount of complication. The sweep time can be varied from 10 to 1,000 seconds per range; thus enabling a total sweep time up to 3,000 seconds. Programmable upper and lower frequency limits allow incremental frequency ranges within the overall range. A DC output voltage is provided which is proportional to a linear or log relationship of the frequency.

Consequently, one object of this invention is to provide a sweep oscillator circuit.

Another object of this invention is to provide a sweep oscillator which is stable and has a wide range of frequency output.

Another object of this invention is to provide a sweep oscillator which is a low-distortion function-generator capable of supplying at least one waveform output signal.

Another object of this invention is to provide a sweep oscillator which is a low distortion function generator which operates on a linear or logarithmic basis.

These and other objects and advantages of this invention will become more readily apparent when the following description is read in conjunction with the attached drawings, in which:

FIGS. 2 through 7 are schematic diagrams of components shown in the block diagram of FIG. 1.

Throughout this description, similar reference numerals refer to similar components.

Figure 1:
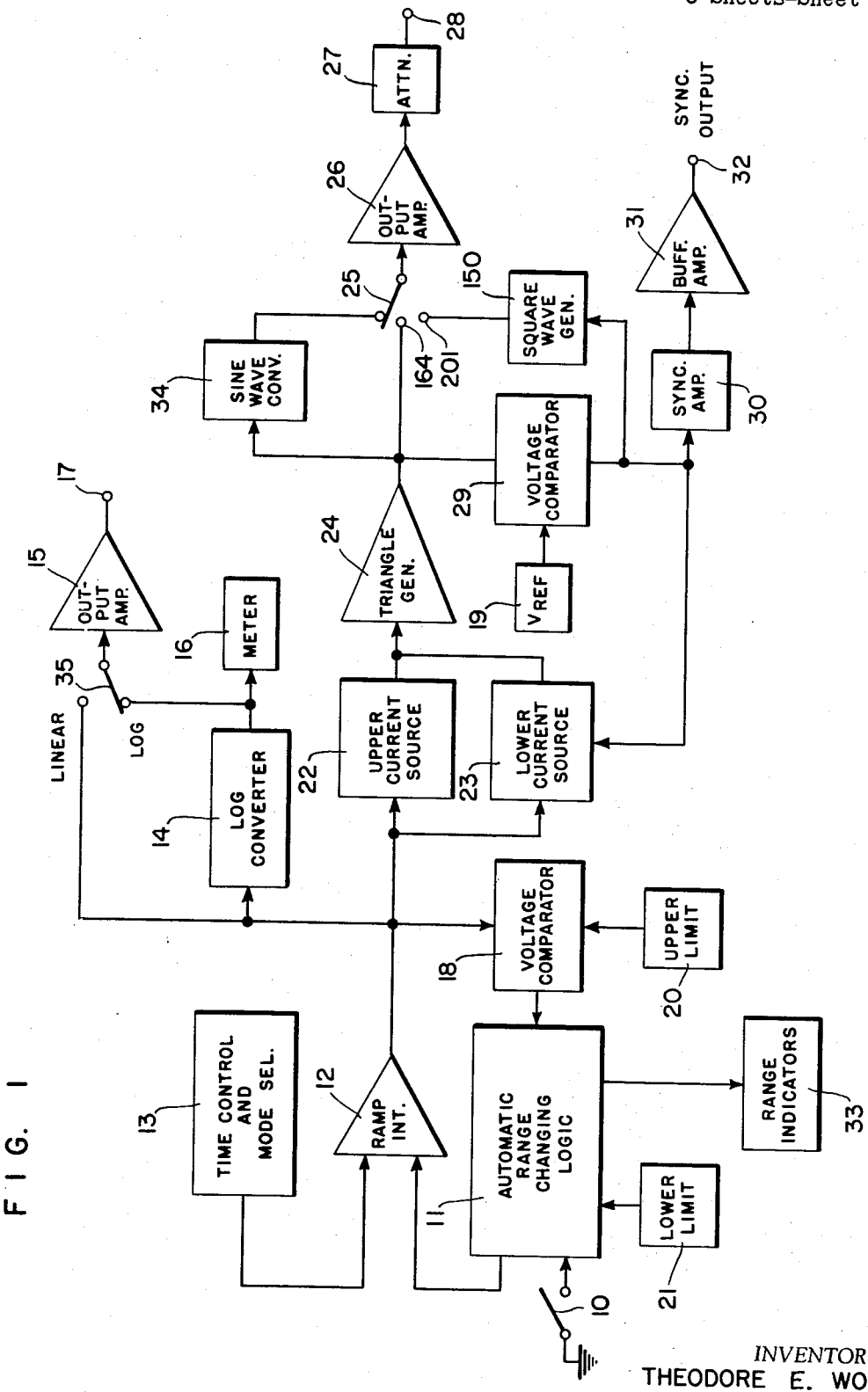
FIG. 1 is a block diagram of the subject invention.

Referring now to FIG. 1, there is shown a block diagram of the subject invention. It should be noted that a power supply source associated with the subject circuit is not shown. Typically, the START switch 10 which is shown connected to a suitable potential source, for example ground, is activated to start the operation of the circuit. START switch 10 is connected to the automatic range changing logic 11. The range changing logic 11 receives an input from voltage comparator 18 and an input from lower limit circuit 21. Voltage comparator 18 receives signals from upper limit circuit 20 and from the ramp integrator 12. Ramp integrator 12 receives signals from time control and mode selection circuit 13, as well as from automatic range changing logic 11. Ramp integrator 12 supplies signals to log converter 14 and to a contact of switch 35. The output of log converter 14 is supplied to meter 16 and to a separate contact of switch 35. The armature of switch 35 is connected to output amplifier 15 which provides an output signal at terminal 17.

The output of ramp integrator 12 is also supplied to the upper current source 22 and lower current source 23. The outputs of upper and lower current sources 22 and 23, respectively, are connected to triangle generator 24. Triangle generator 24 supplies an output signal to sinewave converter 34 wherein the triangle wave is converted to a sinusoidal waveform. The output of sinewave converter 34 is connected to one contact of switch 25. The output of triangle generator 24 is also supplied to an input of voltage comparator 29. Voltage source 19 provides a reference signal for voltage comparator 29. Voltage comparator 29 has the output thereof connected to another terminal of switch 25 via squarewave generator 150. The output of voltage comparator 29 is further connected to an input of sync amplifier 30 and to lower current source 23. The output of sync amplifier 30 is connected via buffer amplifier 31 to sync output terminal 32.

The armature of switch 25 is connected to an input of output amplifier 26. The output of amplifier 26 is connected to terminal 28 via attenuator 27. In addition, a range indicator 33 is connected to an output of automatic range changing logic 11.

Typically, the operation of the circuit is initiated by the operation of START switch 10. When switch 10 is closed, the automatic range changing logic circuit 11 is rendered operative. The functions of logic circuit 11 are several, for example, a signal is applied to range indicators 33 which may be Neon lights or similar indicating devices. Additionally, logic circuit 11 is connected to ramp integrator 12 to initiate and control the operation thereof as will be described hereinafter.

Time control and mode selection circuit 13 supplies a signal to the input of ramp integrator 12 to determine the mode of operation, namely log or linear operation. As well, circuit 13 determines the time period of operation which time period controls the duration of the ramp waveform produced by integrator 12. The ramp waveform has a duration between 10 and 1,000 seconds in the illustrated embodiment.

The ramp signal supplied by integrator 12 is applied to one contact of switch 35 to produce a linear output signal. This signal is, selectively, supplied directly to output amplifier 15 and output terminal 17. It should be noted that mode selection circuit and switch 35 are mutually operable such that the mode of operation is consistent.

In the log mode of operation, the ramp signal supplied by integrator 12 is applied to log converter 14. Log converter 14 operates upon the ramp signal supplied thereto and produces an output signal which is applied to meter 16, as well as to amplifier 15, via switch 35. Again, the output signal is supplied from amplifier 15 to output terminal 17. The log converter 14 operates upon the input ramp voltage and converts same into a logarithmic value.

The output of ramp integrator 12, as noted, is applied to an input of voltage comparator 18. An upper limit control circuit 20 is also connected to an input of voltage comparator 18 and supplies a potential which is compared with the ramp output supplied by integrator 12. When a suitable voltage condition exists, an enabling signal is supplied to automatic range changing logic 11. The signal supplied to the logic circuit 11 will have the effect of initiating operations thereof. Logic circuit 11 will, in response to each of these signals, alter or otherwise control the signal produced by integrator 12.

The output signal from ramp integrator 12 is supplied to the inputs of upper current source 22 and lower current source 23. Typically, lower current source 23 is initially inoperative. Upper current source 22 supplies a signal to triangle generator 24 which is in the nature of a voltage controlled oscillator (VCO). The ramp output signal of triangle generator 24 is supplied to voltage comparator 29 which compares the voltage level of the triangle waveform against a reference voltage $V_{REF}$ supplied by source 19. When a predetermined relationship exists between the voltage supplied to comparator 29, an output signal is supplied thereby which renders lower current source 23 operative. Lower current source 23 supplies a signal to the VCO 24 which signal is of opposite polarity to signals supplied by upper current source 22. Thus, triangle generator 24 produces the negative slope or ramp portion of the triangle waveform in response to the opposite polarity signal supplied by source 23. Again, voltage comparator 29 operates upon this signal to produce a signal which will render source 23 inoperative at a predetermined level. Consequently, a triangle waveform having predetermined upper and lower values is generated.

Sync amplifier 30 is connected to voltage comparator 29. When voltage comparator 29 produces a signal in accordance with the comparison process thereof, sync amplifier 30 receives a signal and operates thereupon to produce a pulse, for example 5 microseconds in duration. This signal is supplied via buffer amplifier 31 to sync output 32 whereby external operations may be synchronized with the internal operation of the oscillator. Buffer amplifier 31 is used to prevent any disturbance at the terminal 32 from being returned to the circuit via the sync amplifier 30.

Moreover, the pulse output produced by comparator 29 is applied to squarewave generator 150. Squarewave generator operates upon the pulse signal to produce a symmetrical squarewave output signal.

The sinewave converter 34 receives the signal from the triangle generator 34 and operates thereupon to produce a sinewave output. The sinewave output from converter 34, along with the triangle output from generator 29 and a squarewave signal from generator 150 are applied to separate contacts of switch 25. The armature of switch 25 is connected to the input of output amplifier 26 which is utilized to provide the proper wave shaping and amplification factors as desired. The output amplifier may include a temperature compensating network to produce a more reliable output signal. Attenuator 27 is utilized to provide control of the output signal supplied by amplifier 26 such that the signal at terminal 28 is of a suitable and desirable magnitude and configuration.

Figure 2:
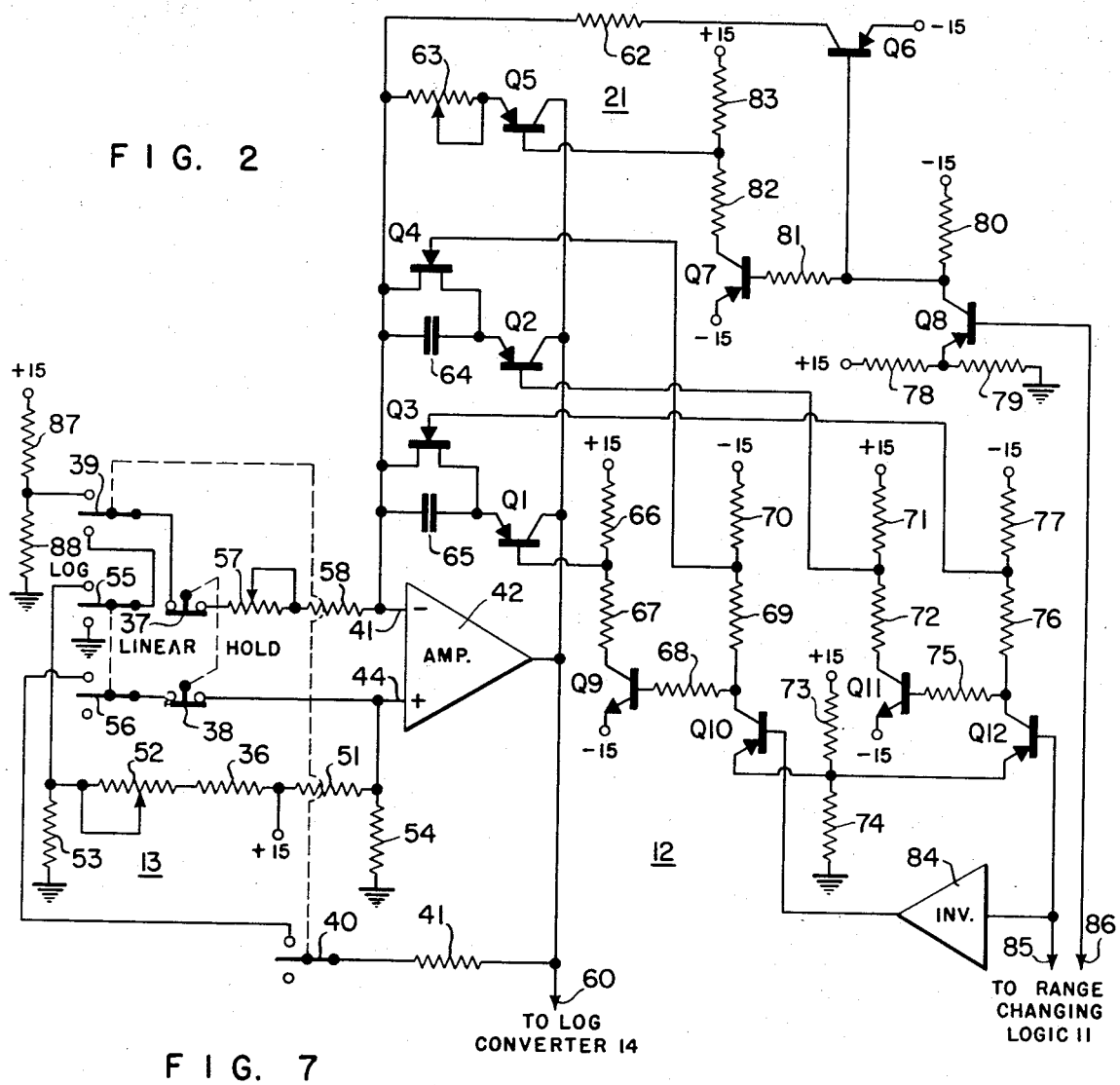

Referring now to FIG. 2, there is shown a schematic diagram of time control and mode selection circuit 13, ramp integrating circuit 12, lower limit circuit 21 and a portion of the automatic changing logic circuit 11. Reference is made to the copending application of T. E. D. Wolk, entitled Signal Generator bearing Ser. No. 660,693, filed on Aug. 15, 1967 and assigned to a common assignee. In the copending application, the signal generator described is substantially similar to the signal generator shown in FIG. 2. Certain modifications are included in the circuit shown in FIG. 2 which modifications are desirable in the instant embodiment.

Operational amplifier 42 has an inverting input 43 and a noninverting input 44. Noninverting input 44 is connected via resistor 54 to ground. In addition, noninverting input 44 is connected via resistor 51 to a +15 v. source. Resistors 36, 52 and 53 comprise a resistor network connected in series between ground and the +15 v. source. Resistor 36 provides a fixed voltage drop or offset voltage while resistor 52 provides adjustable control thereover. The junction between resistors 52 and 53 is connected to the log contact of switch 55. Thus, the resistor network provides preselected voltage levels at the log contact of switch 55 and at input terminal 44 of amplifier 42.

The linear contact of switch 55 is connected to ground. The armature of switch 55 is connected to the normally closed terminal of switch 39. The normally open terminal of switch 39 is connected to the junction of resistors 87 and 88. Resistor 88 is further connected to ground while resistor 87 is further connected to a +15 volt source. The armature of switch 39 is connected via switch 37 to variable resistor 57. Resistor 57 is connected to inverting input terminal 43 of amplifier 42 via resistor 58. Resistor 57 is variable and permits selective adjustment of the sweep time for the circuit. In one embodiment, switch 57 is a one megohm resistor and the time constant variation provided thereby is between 10 and 1,000 seconds.

Input terminal 44 of amplifier 42 is also connected via switch 38 to the armature of switch 56. One terminal of switch 56 (ganged with switch 55) is connected via switch 40 (ganged with switch 39) to feedback resistor 41. Feedback resistor 41 is connected to terminal 60 which is the output terminal of amplifier 42.

Switch 39 is used to reverse the polarity of the input current supplied to terminal 44 of amplifier 42. That is, the signal supplied at input terminal 42 is substantially constant for example, +0.1 volt. The signal supplied by switch 39, when in the position shown, has a maximum value of +0.1 volt. However, when switch 39 is connected to resistors 87 and 88, a potential of about +0.2 volt, i.e. twice the signal applied at terminal 44 is provided at terminal 43. Consequently, the direction of the current is reversed in amplifier 42. This reversal of current direction causes a reversal in the operation of amplifier 42 wherein the output signal generated thereby tends to retrace the previous output in the opposite direction.

However, this reversing operation, while readily obtained in the linear mode is less meaningful in the log mode of operation. Consequently, when the operation of amplifier 42 is reversed by actuation of switch 39, switch 40 is simultaneously operated and the feedback network is opened. When the feedback network is opened, log operation of the amplifier is prevented and a linear output is obtained. If the initial operation were a log operation, the reversed operation would be in a linear mode. However, for most purposes this linear reverse operation is a satisfactory approximation of the instantaneous log mode. It is possible, of course, to omit switch 40 in some applications.

Switches 55 and 56 are also shown ganged wherein log or linear operation is obtained. When switch 55 is in the log condition, switch 56 is connected in the feedback network wherein the logarithmic feedback path comprising resistor 41 is completed. Contrariwise, when switch 55 is in the linear mode of operation switch 56 is disconnected whereby the feedback circuit is opened and nonconductive.

Switches 37 and 38 are shown ganged. Opening of switches 37 and 38 causes the input signals supplied to the terminals 43 and 44 of amplifier 42 to be disconnected from the circuit. Under these circumstances, amplifier 42 will, in essence, hold at the last value supplied thereto and the ramp signal will remain at a fixed level. This will permit the operator to detect the output signal at a particular instant.

In lower limit circuit 21, transistor Q6 has the emitter connected to a −15 volt source and the collector connected via resistor 62 and variable resistor 63 to the emitter of transistor Q5. The junction of resistors 62 and 63 is connected to input terminal 43 of amplifier 42. The collector electrode of transistor Q5 is connected to the output terminal 60 of amplifier 42. Transistors Q5 and Q6 are controlled by a portion of the range changing logic circuit as described herewith. Terminal 86 is connected to the range changing logic 11 as noted hereinafter. This terminal is connected to the base of transistor Q8. The emitter of transitor Q8 is connected to the common junction of a voltage divider network comprising resistors 78 and 79. The voltage divider network is connected between a +15 volt source and ground potential. The collector of resistor Q8 is connected to a −15 volt source via resistor 80. The collector of transistor Q8 is further connected to the base of transistor Q6. Also, the base of transistor Q7 is connected, via resistor 81, to the collector of transistor Q8. The emitter of transistor Q7 is connected to a −15 volt source. The collector electrode of transistor Q7 is connected to a +15 volt source via a series network of resistors 82 and 83. The common junction between resistors 82 and 83 is connected to the base of transistor Q5.

The operation of transistors Q5 and Q6 is controlled by the signal level supplied at terminal 86. For example, assigning a low or negative signal level at terminal 86 causes transistor Q8 to be conductive. Conduction by transistor Q8 produces a relatively positive potential at the bases of transistors Q6 and Q7. These transistors are each rendered conductive by this signal. Conduction by transistor Q7 causes a relatively negative signal to be applied at the base of transistor Q5. Thus, transistor Q5 is rendered conductive. When transistors Q5 and Q6 are conductive, the current detected at the common junction between resistors 62 and 63 is a function of the adjustment of resistor 63. This current at the aforesaid common junction is the "lower limit current" which is applied to the input terminal 43 of amplifier 42.

If the signal level at terminal 86 rises and becomes relatively positive, transistor Q8 is turned off. When transistor Q8 is nonconductive, a relatively negative potential is supplied to the bases of transistors Q6 and Q7. These transistors are then rendered nonconductive. When transistor Q7 is nonconductive, a relatively positive signal is applied to the base of transistor Q5. Transistor Q5 is turned off by this signal. With transistors Q5 and Q6 turned off, no current flows through resistors 62 and 63. With no current conduction through resistors 62 and 63, there is no lower limit current supplied to input terminal 43 of amplifier 42.

The integrating feedback network connected in parallel with amplifier 42 comprises transistors Q1, Q2, Q3 and Q4. Typically, transistors Q3 and Q4 are field-effect transistors (FET). Transistors Q1 and Q2 have the collector electrodes connected to the output terminal 60 of amplifier 42. Capacitors 64 and 65 are connected between the input terminal 43 of amplifier 42 and the emitter electrodes of transistors Q2 and Q1, respectively. Transistor Q3 is connected in parallel with capacitor 65 while transistor Q4 is connected in parallel with capacitor 64. The base electrodes of transistors Q1 and Q2 and the gate electrodes of transistors Q3 and Q4 are connected to the range changing logic 11.

More specifically, the base of transistor Q1 is connected to the common junction of resistors 66 and 67 which are connected between a +15 volt source and the collector electrode of transistor Q9. The emitter electrode of transistor Q9 is connected to a −15 volt source. The base of transistor Q9 is connected via resistor 68 to the collector electrode of transistor Q10. The collector of transistor Q10 is connected via a voltage divider network comprising resistors 69 and 70 to a −15 volt source. The common junction between resistors 69 and 70 is connected to the gate electrode of transistor Q4. The base of transistor Q10 is connected to the output of inverter 84. The emitter electrode of transistor Q10 is connected to the common junction of resistors 73 and 74 which comprise a voltage divider network connected between a +15 volt source and ground. In addition, the common junction is connected to the emitter of transistor Q12. The base of transistor Q12 is connected to terminal 85. The collector of transistor Q12 is connected to terminal 85. The collector of transistor Q12 is connected, via resistors 76 and 77 to a −15 volt source. The common junction between resistors 76 and 77 is connected to the gate electrode of transistor Q3.

The base electrode of transistor Q11 is connected, via resistor 75 to the collector electrode of transistor Q12. The emitter electrode of transistor Q11 is connected to a −15 volt source while the collector electrode is connected to a +15 volt source via series connector resistors 71 and 72. The common junction of resistors 71 and 72 is connected to the base electrode of transistor Q2.

In operation, a signal is supplied to terminal 85 via range changing logic circuit 11. This signal is supplied directly to the base of transistor Q12 and, after inversion by inverter 84, is applied to the base of transistor Q10. Clearly, because of the inversion, the signal supplied at terminal 85 will cause the opposite results at transistors Q10 and Q12. For example, assume the application of a negative signal at terminal 85. Transistor Q12 is turned on while transistor Q10 is turned off. As a result, transistor Q11 is turned on and transistor Q9 is turned off. As a direct result of these actions, transistors Q2 and Q3 are turned on while transistors Q1 and Q4 are turned off. With transistors Q2 and Q3 turned on, capacitor 64 is connected in series therewith across amplifier 42, while capacitor 65 is subjected to a direct short thereacross. In addition, since transistor Q1 is turned off, no current flow exists in capacitor 65 and the residual charge thereof is drained off by transistor Q3. Capacitor 64 exhibits current flow because of the operation of transistor Q2 and the current drain is prevented inasmuch as transistor Q4 is turned off.

When the signal applied at terminal 85 changes state, the operation is significantly different. That is, if a positive signal is applied to terminal 85, transistor Q12 is immediately turned off. When transistor Q12 turns off, transistors Q11, Q3 and Q2 are likewise turned off and are nonconductive. On the contrary, negative signal is applied by inverter 84 to transistor Q10. This signal turns on transistor Q10 whereby transistors Q9, Q1 and Q4 are also turned on. Thus, capacitor 65 is now in series with an operative transistor and the current draining shunt thereacross is removed. Conversely, capacitor 64 is connected in series with a nonconductive transistor and a current draining short circuit is connected thereacross. Thus, the application of a signal at terminal 85 causes the range capacitors 64 and 65 to be selectively inserted in parallel with amplifier 42. This operation "changes the range" of the integrating amplifier. The output signal at terminal 60 will be in the nature of a ramp signal which is returned to the initial level at each range changing. The output ramp signal may be a linear signal or a log signal with respect to time in accordance with the position of switches 55. In addition, the output signal may change slope direction in accordance with the position of switch 39.

Referring to FIG. 3 there is shown a schematic diagram of log converter 14, output amplifier 15, voltage comparator 18 and upper limit source 20. Input terminal 60 is contiguous with terminal 60 shown in FIG. 2. Thus, the output of the ramp integrator is applied to the log converter. The signal is supplied to switch 125 and more particularly, to the contacts labelled "REPEAT," "SINGLE," "LOWER LIMIT." The other terminals of switch 125 are connected to the "MANUAL" control network and the "UPPER LIMIT" circuit as will be described hereinafter.

Switch 124 is associated with switch 125 in ganged relationship such that switches 124 and 125 operate concurrently. In the case of switch 124, the armature is connected to ground. The contacts of switch 124 which correspond to the contacts "MANUAL," "LOWER LIMIT," and "UPPER LIMIT" of switch 125 are joined together and connected to terminal 131 which is connected to the range changing logic 11. The contact which corresponds to the "SINGLE" contact of switch 125 is connected via resistor 149 to the "UPPER LIMIT" contact on switch 125, while the counterpart "REPEAT" contact is connected to terminal 130 which is similarly connected to the range changing logic 11. In addition, the counterpart "REPEAT" contact is connected via resistor 259 to the "UPPER LIMIT" contact in switch 125. Resistors 149 and 249 place an inhibited load on the "UPPER LIMIT CIRCUIT."

The "MANUAL" contact of switch 125 is connected to a manually operated resistance control network. The contact is connected to one terminal of variable resistor 133 which has the other terminals connected to the variable terminal of resistor 104. Resistor 104 is connected between suitable potential sources, as for example +15 volts and ground. Resistor 104 provides a coarse adjustment while resistor 133 provides a fine adjustment of the potential which is supplied to the MANUAL contact of switch 125.

The "UPPER LIMIT" contact of switch 125 is connected to the upper limit circuit 20. The upper limit circuit 20 comprises variable resistors 118 and 117 connected in series between suitable potentials, for example +15 volts and ground. Resistor 118 is a variable resistor and is used for adjustment of the potential supplied across resistor 117. Resistor 117 is a variable resistor wherein the adjustable terminal thereof is connected to the upper limit contact of switch 125.

The armature of switch 125 is connected to terminal 129 which is connected to the upper and lower current sources 22 and 23, respectively. The armature of switch 125 is further connected via resistor 122 to the inverting input of amplifier 123. The non-inverting input of amplifier 123 is connected to a suitable reference potential, for example ground. The output of amplifier 123 is connected via resistor 103 to meter 16 which is referenced to a suitable potential, for example ground. Thus, meter 16 is utilized to indicate the output signal produced by amplifier 123.

Amplifier 123 has a feedback network which produces a compensated log output signal. For example, the output terminal of amplifier 123 is connected to the base of transistor Q16 via resistor 101 and variable resistor 102. These series connected resistors control the base current for transistor Q16. The base of transistor Q16 is further connected to ground via temperature sensitive resistor 99. The collector of transistor Q16 is connected to the emitter of transistor Q17. The emitter of transistor Q17 is connected to ground via resistor 95. A bias network comprising resistors 96 and 97 are connected between the collector electrode of transistor Q17 and ground. The collector of transistor Q17 is connected to a +15 volt source. The common junction between resistors 96 and 97 is connected to the base of transistor Q17. Resistor 98 is connected between the collector electrode of transistor Q17 and the base of transistor Q16. Resistor 98, in conjunction with resistor 99, provides a bias at the base of transistor Q16. Resistor 98 is variable to provide adjustment of the potential values. A filter capacitor 100 is connected between the collector electrode of transistor Q17 and ground.

The emitter of transistor Q16 is connected to the base of transistor Q15. The emitter of transistor Q15 is connected to the inverting input of amplifier 123. The collector electrode of transistor Q15 is connected to the emitter electrode of transisor Q14, which is further connected to ground via resistor 93. The collector electrode of transistor Q14 is connected to a +15 volt source and to the base of transistor Q15 via resistor 94. A bias network comprising resistors 91 and 92 are connected between the collector electrode of transistor Q14 and ground. The common junction between resistors 91 and 92 is connected to the base of transistor Q14. A filter capacitor 90 is connected from the collector of transistor Q14 to ground.

The output of amplifier 123 is further connected to the LOG terminal of switch 35. The LINEAR terminal of switch 35 is connected to ground. The armature of switch 35 is ganged with the armature of switches 126 and 127, whereby concurrent operation of the switches is achieved. The LOG-associated contact of switch 126 is connected via resistor 105 to ground. The LINEAR-associated contact of switch 126 is connected to the armature of switch 125. The LOG-associated contact of switch 127 is connected to terminal 128. This terminal is connected to an offset voltage circuit which is associated with the range changing logic shown in FIG. 6. The LINEAR-associated contact of switch 127 is connected to terminal 17, the output of amplifier 109.

The armature of switch 126 is connected to the non-inverting input of amplifier 109. The armature of switch 127 is connected directly to the inverting input of amplifier 109. The armature of switch 35 is connected via variable resistor 34 and resistor 107 to the inverting input of amplifier 109. Feedback resistor 108 is connected between output terminal 17 and the inverting input amplifier 109. The ramp output terminal 17 is connected to the output of amplifier 109.

The armature of switch 125 is further connected to one end of a voltage divider network comprising resistors 120 and 121 which network is referenced to ground. The common junction of the resistors is connected to the base of transistor 182 which is connected as an emitter follower. The emitter of transistor 182 is connected to the non-inverting input of amplifier 110 of voltage comparator 18. The inverting input of amplifier 110 is connected via filter capacitor 119 to ground. The inverting input is further connected to the emitter of transistor Q52 which is connected as an emitter follower. The emitter of transistor Q52 is connected to a source of potential —V via resistor 178. The collector of transistor Q52 is connected to +15 v. The base of transistor Q52 is connected to the collector electrodes of transistor Q18 and emitter electrode of transistor Q19. The collector of transistor Q19 is connected via resistor 135 to the variable tap of resistor 117 in the upper limit control circuit 20. Additionally, the collector electrode of transistor Q19 is connected via resistor 112 to ground. The base electrode of transistor Q19 is connected via resistor 111 to terminal K of multicontact switch 700 which is a portion of the automatic range changing logic 11.

The base of transistor Q18 is connected to ground via a voltage divider network comprising resistors 113 and 114. The common junction of the resistors is connected to terminal L of switch 700. The emitter electrode of transistor Q18 is connected to a bias source comprising resistors 116, 136 and 115 which are connected between a suitable source, for example +15 volts, and ground. Resistor 136 is a variable resistor having a variable tap connected to the emitter of transistor Q18 to provide suitable control over the signal supplied thereto.

In the operation of the log converter, a signal E$In$ is supplied to amplifier 123 via resistor 122. A current is developed through resistor 122 which is determined by the function of the input voltage divider by the resistance of resistor 122. This relationship obtains inasmuch as point 137 is the summing point of amplifier 123 and is a virtual ground. Amplifier 123, in an ideal case, draws no current. Consequently, the input current through resistor 122 must flow through transistor Q15 such that the input current $I_{1N}$ equals the emitter current $I_E$ in transistor Q15. This emitter current produces a base-emitter voltage across transistor Q15 which voltage is proportional to the logarithm of the emitter current $I_E$.

Transistor Q16 and resistor 94 form an emitter follower circuit. Transistor Q16 is biased to produce an emitter current $I_{E2}$ which is equal in magnitude to the maximum input current $I_{1N}$. Emitter current $I_{E2}$ is much larger than the base current $I_{E1}$ produced by transistor Q15. Thus, as $I_{1N}$ (as well as the base emitter voltage of transistor Q15) changes, the base emitter voltage for transistor Q16 remains substantially constant. The biasing arrangements are provided by the several resistors shown and the transistors Q14 to Q17 respectively.

Typically, transistors Q15 and Q16 are matched for substantially equal base-emitter voltage when the emitter currents thereof are equal. Thus, at maximum input current, the base-emitter voltage of transistor Q15 is cancelled by the base-emitter voltage of transistor Q16 and point 139 is at substantially zero volts. When the input current is less than the maximum, the base-emitter voltage of transistor Q16 is larger than the base-emitter voltage of transistor Q15 so that the voltage at point 139 is equal to the difference therebetween. Since the change in the base-emitter voltage of transistor Q15 is proportional to the logarithm of the input current, the voltage at point 139 is also proportional to the logarithm of the input current.

The voltage change at point 139 in response to an input current change causes a current change $\Delta I_S$ in the resistance network comprising resistors 101 and 102. This current change is defined by the relationship of the voltage change at point 139 divided by the resistance of temperature sensitive resistor 99. This current change through resistors 101 and 102 produces an output voltage change $\Delta E_O$ at the output of amplifier 123. The voltage change is dependent upon the ratio of the resistance of resistor 99 to the resistance of resistors 101 and 102. Thus, the system equation is given by $$E_O = \frac{-R_F}{R_T} Kl \log \frac{E_{1N}}{R_{1N}} + K2$$

Thus $E_O$ is the output voltage produced by the circuit while $R_F$ is the total resistance of resistors 101 and 102. $R_T$ is the resistance of resistor 99. $E_{1N}$ and $R_{1N}$ are previously defined. K1 and K2 are constants dependent upon the operating characteristics of transistor Q15 and the minus sign is produced inasmuch as amplifier 123 inverts the input signal. It should be noted that in order to utilize negative going input signals the polarity of the transistors in the feedback network must be changed.

Transistors Q15 and Q16 are carefully matched such that the emitter currents thereof, as well as the base emitter voltages of each of the transistors, is substantially equal at the maximum input current. That is, at $I_{1N} = I_{KE1}$ point 139 is at zero volts with respect ot ground which permits the positive temperature coefficient resistor 99 to change with temperature. Since there is no voltage across resistor 99, no current change occurs therein and the output voltage at the output of amplifier 123 does not change. Moreover, since transistors Q15 and Q16 are matched, the temperature coefficients thereof are also equal and cancel the respective effects produced thereby.

When the input current $I_{1N}$ is less than the emitter current of transistor Q16 (which emitter current is fixed), the temperature coefficient of transistor Q15 becomes larger than the temperature coefficient of transistor Q16. Under these circumstances, voltage change at point 139 occurs with temperature variation. More specifically, an increasing temperature will provide a more positive potential at point 139. Resistor 99 is chosen to have a positive temperature coefficient which will change in proportion relative to the voltage at point 139. Thus, with a proper temperature coefficient for resistor 99, there is no change in the current in resistors 101 and 102 whereby the output voltage does not change with temperature.

The input signal which is applied to amplifier 123 is applied to terminal 60 from the circuit shown in FIG. 2. Terminal 60 is connected to the "REPEAT" and "SINGLE" and "LOWER LIMIT" contacts of switch 125. Consequently, when the armature of switch 125 is connected to either of these contacts, the ramp signal is applied to the input of amplifier 123.

In the alternative, when switch 125 is connected to the "MANUAL" contact, the signal supplied to the input of amplifier 123 is provided by resistors 104 and 133. The MANUAL control, as noted supra, includes the variable resistor 104 which provides the coarse adjustment for the manually controlled input signal. After resistor 104 is adjusted, switch 133 is further adjusted, as needed, to provide the fine control over the input signal supplied.

A similar control is provided by UPPER LIMIT CIRCUIT 20. Thus, resistor 118 is adjusted for a suitable potential drop across resistor 117. Resistor 117 is further adjusted and supplies a suitable potential to the UPPER LIMIT contact of switch 125. As will be described in more detail hereinafter, the armature of switch 125 is connected to terminal 129 wherein each of the input signals is supplied to the current sources.

As noted supra, the armature of switch 124 is connected to ground and is ganged with the armature of switch 125. The contacts of switch 124 are associated with contacts of switch 125. These contacts are connected together, as shown and previously described, and connected to the range changing logic terminals 130 and 131. Thus, depending upon the mode of operation as selected by switch 125, certain terminals in the range changing logic circuit receive ground level signals.

Amplifier 109 (part of output amplifier 15) has the inputs connected to the armatures of switches 35, 126 and 127. When the circuit is operating in the linear mode, switch 35 is grounded. Switch 127 connects to the output of amplifier 109 with the inverting input thereof thereby providing a short circuit feedback path.

Switch 126 is connected to receive the output signals from the ramp generator. Switch 126 applies this signal directly to the non-inverting input of amplifier 109 whereby a linear ramp signal is provided at the output of amplifier 109. Alternatively, when the circuit is in the log mode of operation, the inverting input of amplifier 109 receives the log output signal produced by amplifier 123 via switch 35. This signal is summed with the offset voltage supplied to switch 127 via terminal 128. As will appear hereinafter, the range changing logic 11 will provide an offset or pedestal voltage at the end of each range to provide a continuous output signal.

The inverting input of amplifier 109 is connected to ground by switch 126 and resistor 105 in the linear mode of operation. Because of the connections at the inputs, amplifier 109 operates as an inverting and logarithmic amplifier in the log mode of operation. When in the linear mode, amplifier 109 operates as a non-inverting linear amplifier with unity gain. The output signal provided by the amplifier is supplied to terminal 17. Thus, this operational amplifier is used to select either the linear or logarithmic function of the ramp voltage, condition it, and act as a buffer for supplying the output signal to terminal 17.

Ramp voltage comparator 18 comprises amplifier 110 which has the non-inverting input thereof connected, via emitter follower Q52, to a junction of a voltage divider comprising resistors 120 and 121. The junction is connected to the armature of switch 125 to detect the same signals supplied to amplifier 123. The inverting input of amplifier 110 is connected through filter capacitor 119, to ground. This inverting input is further connected to reference sources via emitter follower Q53 which are separately controlled and applied. The first source is associated with the upper limit control circuit 20 and includes transistor Q19. The base of transistor Q19 is connected to the contact K of switch 700 shown in FIG. 7. The collector of transistor Q19 is connected to the variable tap of resistor 117 in the upper limit control circuit via resistor 135. When transistor Q19 is rendered conductive by the signal at contact K, the upper limit control circuit signal is supplied via the emitter of transistor Q19 and emitter follower Q53 to the non-inverting input of amplifier 110.

In the alternative, when transistor Q18 is rendered conductive by the application of a suitable signal at terminal L which is connected to the base of transistor Q18 by resistor 113 the potential applied to the emitter of transistor Q18 is connected to the inverting input of amplifier 110 via emitter follower Q53. It should be noted that terminals K and L are arranged so as to instantaneously supply opposite polarity signals whereby transistors Q18 and Q19 are mutually exclusively operable. Consequently, the signal supplied to the inverting input of amplifier 110 is controlled either by the upper limit circuit 20 or by the programmable circuit comprising transistor Q18 and the associated voltage divider network.

The signals supplied to the inputs of amplifier 110 are compared as to amplitude. When the signal supplied to the non-inverting input exceeds the amplitude of the reference potential, the output signal supplied by the comparator changes state. In the preferred embodiment, the signal switches from ground to a positive potential. This signal is applied to terminal 132 which is one input of the control gate (see FIG. 6) in the range changing logic circuitry. As will become more apparent, subsequently, this enabling signal is instrumental in the operation of changing the range of the ramp generator shown in FIG. 2. More specifically, a signal at terminal 132 indirectly controls the signal supplied to terminal 85 (see FIG. 2) and the operation of the switching circuits which are affected thereby.

Figure 4:
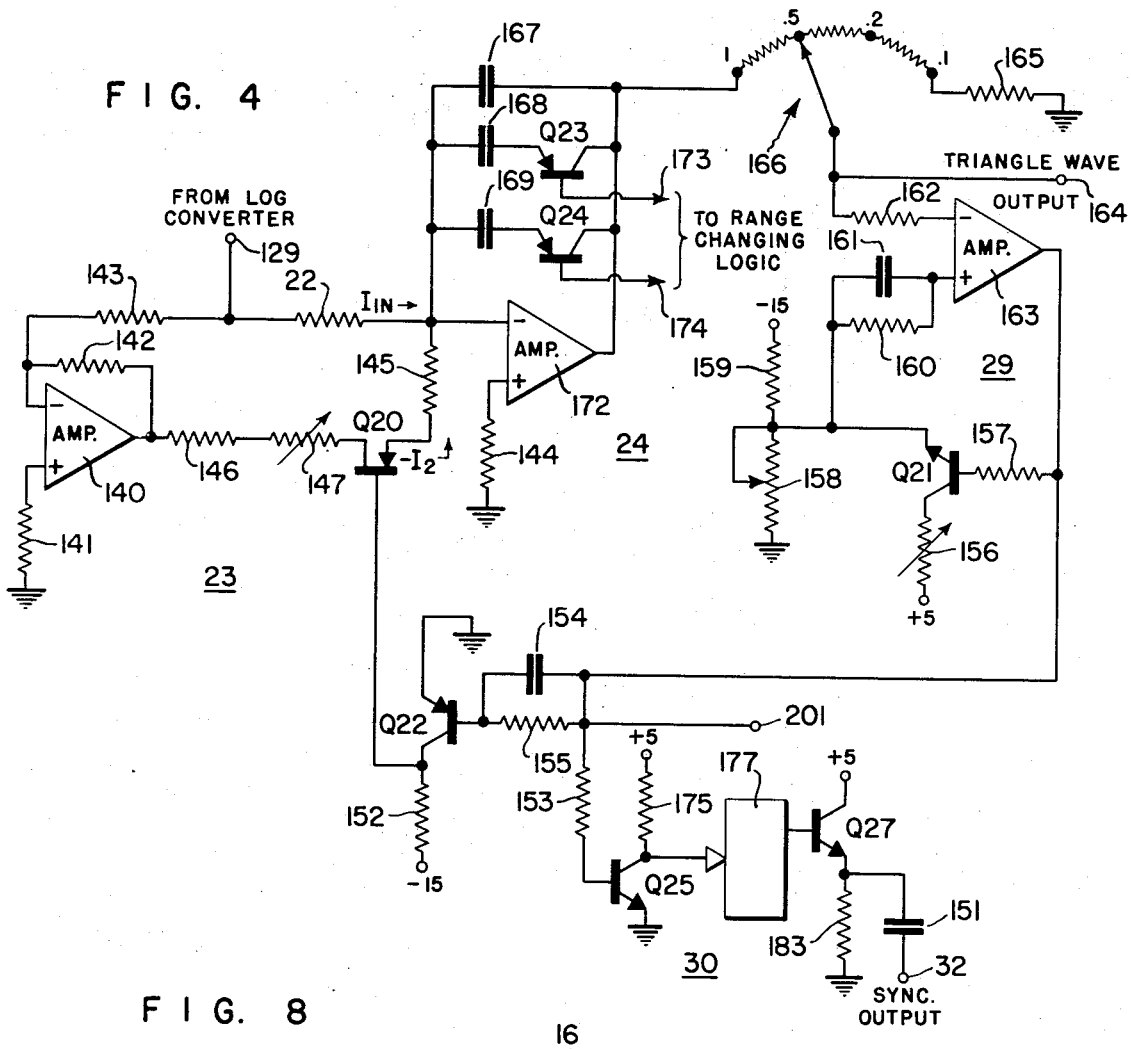

Referring now to FIG. 4, there is shown a schematic diagram of the triangle generator (VCO) 24, upper current source 22, lower current source 23, voltage comparator 29 along with its references source 35, and sync amplifier 30.

The triangle generator 24 includes amplifier 172 which has the noninverting input connected to ground via resistor 144. The inverting input is connected, via resistor 22, to terminal 129 which is connected to the armature of switch 125 shown in FIG. 3. Resistor 22 also functions as the upper current source which provides a positive current from the ramp integrator or the manual control to the input summing point of amplifier 172.

Capacitor 167, 168 and 169 all have one terminal thereof connected together and to the inverting input of amplifier 172. Capacitor 167 has another terminal thereof connected to the output of amplifier 172. Capacitors 168 and 169 have the other terminals thereof connected to the emitter electrodes of transistors Q23 and Q24, respectively. The collectors of these transistors are connected to the output of amplifier 172. The bases of transistors Q23 and Q24 are connected to terminals 173 and 174, respectively. These terminals are connected to the range changing logic circuit 11 shown in FIG. 6. The output of amplifier 172 is connected to switch 166 which is an attenuating switch whereby the output frequency of circuit 24 is controlled. Resistor 165 is connected between switch 166 and ground to provide a minimum resistive value in the output load. The armature of switch 166 is connected to terminal 164 which is the triangle wave output terminal.

The output terminal at the armature of switch 166 is further connected via resistor 162 to the inverting input of amplifier 163 of comparator circuit 29. The voltage reference source 35 includes a voltage divider network comprising resistors 159 and 158 connected in series between a −15 volt source and ground. Resistor 158 is variable whereby adjustment in the reference voltage may be achieved. The common junction between resistors 158 and 159 is connected via the coupling network comprising resistor 160 and filter capacitor 161 to the non-inverting input of amplifier 163. The feedback network comprising resistor 157, variable resistor 156, and transistor Q21 are connected between the output of amplifier 163 and the coupling network at the non-inverting input. Transistor Q21 is connected such that when the output of amplifier 163 is positive, transistor Q21 will conduct thus producing a positive voltage at the junction of resistors 159 and 158. Thus, a positive signal is junction of resistors 159 and 158. Thus, a positive signal is supplied to the non-inverting input of amplifier 163 via capacitor 161 and resistor 160.

The output of amplifier 163 is further connected to the lower current source 23. Specifically, the connection is made via a coupling network comprising resistor 155 and filter capacitor 154 to the base of transistor Q22. The collector of transistor Q22 is connected via resistor 152 to a −15 volt source. The emitter of transistor Q22 is connected to ground.

The collector electrode of transistor Q22 is further connected to the base of field-effect transistor Q20. The source electrode of FET Q20 is connected via resistor 145, to the inverting input of amplifier 132. The drain electrode of transistor Q20 is connected via variable resistor 147 and resistor 146 to the output of amplifier 140. The non-inverting input of amplifier 140 is connected to ground via resistor 141. Feedback resistor 142 connects the output of amplifier 140 to the inverting input thereof. This input is further connected via resistor 143 to terminal 120 noted supra.

The output of amplifier 163 is further connected via resistor 153 to the base of transistor Q25. The emitter of transistor Q25 is connected to ground while the collector electrode is connected via resistor 175 to a +5 volt source. In addition, the emitter is connected to the inverting toggle input of monostable multivibrator 177. The output of multivibrator 177 is connected to the base of transistor Q27. The emitter of transistor Q27 is connected to ground via resistor 183 and is further connected to sync output terminal 32. The collector electrode of transistor Q27 is connected to +5 volts.

In operation, amplifier 172 is a standard operational amplifier which is utilized as an integrator. The feedback capacitors 167, 168 and 169 are controlled by the range changing logic circuitry shown in FIG. 6. As will appear subsequently, the signals normally applied to terminals 173 and 174 are such that resistors Q23 and Q24 are non-conductive. Thus, only capacitor 167 is, initially, included in the feedback circuit. The signal is then applied to terminal 173 or 174 (as the case may be) by the range changing logic. The associated transistor is rendered conductive and the pertinent capacitor is included in the feedback network. Subsequently, the proper signal is applied at the other of the terminals wherein the remaining transistor and capacitor are included in the feedback network. Thus, the three capacitors are inserted, sequentially, into the feedback network to control the output signal supplied by amplifier 24 to switch 166. The signal is applied across switch 166 which, in fact, is an attenuator having predetermined resistance ratios. The desired multiplier constant is selected by the positioning of the armature of switch 166. The signal selected is applied to triangle wave output terminal 164.

Additionally, the signal is supplied via resistor 162 to amplifier 163. A predetermined voltage reference signal is supplied to the other input of amplifier 163. Assuming initially, that the triangle input supplied via resistor 162 is a negative going signal, a negative reference signal is supplied by source 35. When the input signal is equal to the reference signal, amplifier 163 produces a signal which varies for example from −1 to +4 volts. This signal is applied to the lower current source circuit 23 (as will be described hereinafter) and causes the output signal to change to a positive slope. Thus, the negative or lower level of the triangle signal has been determined.

Additionally, the relatively positive output signal of amplifier 163 is applied to the noninverting input thereof through transistor Q21. This, in effect, produces a new positive, reference signal. As the input signal attains the level of the new reference signal, amplifier 163 again switches and produces a low level signal. This signal change again triggers the low current source and causes amplifier 172 to produce a negative going slope. Thus, the upper and lower limits on the triangular waveshapes are determined.

Referring to the current sources, the upper current source comprises resistor 22 which controls the current flowing from terminal 129 into amplifier 172. This current, for purposes of discussion, is labelled $I_{IN}$. It is initially assumed that transistor Q20 is nonconductive, such that there is no current flow in this path which is part of the lower current source 23. Thus, the total current summed at the inverting input of amplifier 172 is $I_{IN}$. Amplifier 172 is an inverting integrator such that the output voltage will be a negative ramp voltage with the application of a positive input signal. When the output voltage reproduced by amplifier 172 reaches the potential supplied by reference source 35, amplifier 163 switches as noted supra. The signal supplied by amplifier 163 is a positive going signal, for example. This signal causes transistor Q22 to be turned off whereby a relatively negative signal is applied to the base of transistor Q20. This signal causes transistor Q20 to conduct. Consequently, a current I2 flows (in a negative direction) into the summing junction at amplifier 172. Since amplifier 140 has a gain factor of −1, and with proper selection of the circuit resistors 145, 146, and 147, the magnitude of current I2 is twice the magnitude of current $I_{IN}$. Consequently, the net effect is that the current through the feedback network associated with amplifier 172 is equal to $-I_{IN}$. Thus, the output signal produced by amplifier 172 is a positive going ramp signal starting at the negative reference potential at the comparator. As the positive ramp reaches the new positive reference potential at the comparator, the comparator again changes state wherein a relatively negative signal is reapplied to the lower current source. This negative signal renders transistor Q22 conductive such that the gate electrode of FET Q20 is substantially short to ground. Transistor Q20 is rendered nonconductive by the negative signal at its gate and I2 becomes zero. Thus, the initial conditions are resumed.

The output of amplifier 163 is further applied to the sync amplifier 30. With each peak of the triangle waveform, amplifier 163 provides the leading (or trailing) edge of a substantially square wave. This signal may be utilized to provide an output signal wherein external or peripheral equipment may be synchronized with the operation of the subject circuit. The square wave signal which varies between −1 and +4 volts is supplied via resistor 153 to the base of transistor Q25. Transistor Q25 is an inverting transistor switch which shifts the level of the square wave. Transistor Q25 supplies a signal varying between 0 and +5 volts to the toggle input of monostable multivibrator 177. The multivibrator, which may be an integrated circuit, produces an output signal having a duration of approximately 5 microseconds which is applied to emitter follower transistor Q27 whereby a low impedance drive circuit is obtained. The output of the emitter follower is applied to the sync output terminal 32 via coupling capacitor 151.

The output signal supplied by amplifier 163, as noted, is a square wave signal varying between −1 and +4 volts. A square wave pulse which is symmetrical is more desirable. The square wave produced by amplifier 163 is supplied to output terminal 201 for further operation by an output amplifier 26.

Referring now to FIG. 5, there is shown sinewave converter 34 along with output amplifier 26, attenuator 27, and squarer 150. The triangular wave signal is supplied at terminal 164 which is selectively connected to the sinewave converter 170 via switch 184 and resistor 204. Terminal 164 is further connected to one contact of switch 185 of output amplifier 26. A detailed description of the sinewave converter is not included herein but cross-reference is made to the copending application of T. E. Wolk, Ser. No. 660,819, filed Aug. 15, 1967 entitled Triangle Wave to Sine Wave Converter and is assigned to a common assignee. Briefly the sinewave converter comprises an amplifier circuit 170, a limiter circuit 171 and a filter or connection circuit 180. The amplifier 170 operates upon the input signal, if necessary, to establish a proper relationship between the input signal and the output signal. In addition, amplifier 170, as shown, inverts the input signal. Limiter 171 effectively truncates the peaks of the triangular waveshape thereby suppressing the fifth and seventh harmonics thereof. The truncated signals are supplied to the filter circuit 180 which operates to provide a sinewave output. This sinewave is generated inasmuch as the field-effect transistor Q38 follows a substantially sinusoidal portion of its characteristic in the operating region.

The sinewave output signal is applied along conductor 181 to a contact of switch 186. The triangle wave output is supplied to a contact of switch 184. The square wave from terminal 201 of FIG. 4, is applied to a contact 201 of switch 187. The square wave at terminal 201 is asymmetrical with respect to amplitude, and varies for example between +5 v. and −1 v. To obtain symmetrical square wave, the waveform from switch 187 is connected to a bilateral switch unit 150. The input signal is connected to the drain of FET Q28. The gate electrode of FET Q28 is connected to the junction of resistor 194 and the cathode of Zener diode 195. The anode of Zener diode 195 is connected to ground while the other side of resistor 194 is connected to a +15 volt source. The voltage established at the gate electrode of FET Q28 is +5 v. When the input signal is +5 v., FET Q28 is turned on, thus, supplying current through resistors 198 and 197 to a minus voltage and through resistors 199 and 200 to the input of amplifier 26. When the input signal is −1 v., FET Q28 is turned off. A negative voltage established by resistor 197 and Zener diode 202 then supplies current of opposite polarity through resistors 197, 198, 199 and 200 to amplifier 26. Resistor 198 is adjusted so that the output square wave produced by amplifier 26 is symmetrical in amplitude.

Switches 184, 185, 186, 187 and 188 are ganged and are operable to selectively apply the sine, triangle, or square wave to the amplifier circuit 26. Coupling resistors 190, 192 and 193 and 200 and 199 are selectively connected to provide a proper current input to the amplifier. The input resistor networks 192 and 193, 190 and 200 and 199 have further terminals thereof connected together and to the base of transistor Q39. Resistor 232 is connected between the +22 volt source and the collector electrode of transistor Q39 while the emitter electrode is connected to the −22 volt source via the series connected resistors 233 and 235. Transistor Q40 is connected in differential amplifier fashion relative to transistor Q39. Resistor 236 is connected between the +22 volt source and the collector electrode of transistor Q40. Resistor 234 is connected between the junction of resistors 233 and 235 and the emitter electrode of transistor Q40. A voltage divider network comprising resistors 237, 238 (which is variable) and 239 is connected between the +15 and −15 volt sources. The junction of resistors 237 and 238 is connected to ground via resistor 241 while the junction of resistors 238 and 239 is connected to ground via resistor 240. The base electrode of transistor Q40 is connected to the variable tap of resistor 238.

Transistors Q41 and Q42 are also connected together in differential amplifier configuration. The emitter of the transistors are connected to the +22 volt source via common resistor 242. The base of transistor Q41 is connected to the collector of transistor Q39. Similarly, the base of transistor Q42 is connected to the collector electrode of transistor Q40. The collector electrode of transistor Q41 is connected to the −22 volt source via resistor 244. The collector electrode of transistor Q42 is connected to ground via the series network comprising diode 243 and resistor 245.

A push-pull output configuration is effected through transistors Q43 and Q44. The base of transistor Q43 is connected to the junction of the collector electrode and the anode of diode 243. The base of transistor Q44 is connected to the junction of the cathode of diode 243 and resistor 245. The collector of transistor Q44 is connected via resistor 249 to the −22 volt source and via comparator 247 to ground. The collector of transistor Q43 is connected via resistor 248 to the +22 volt source and via capacitor 246 to ground. The emitters of transistors Q43 and Q44 are connected to each other and to one terminal of feedback resistor 250 and capacitor 182. Another terminal of resistor 250 and capacitor 182 is connected to the base of transistor Q39. The feedback network provides a degenerative type feedback.

Variable resistor 27 is connected between ground and the emitters of transistors Q43 and Q44. Output terminal 28 is connected to the variable terminal of resistor 27 via resistor 511. By varying the position of the variable terminal of resistor 27, the output signal produced by output amplifier 26 may be attenuated as required.

In operation, the input signal be it sine, triangle or square wave, is applied via the associated resistor to the base of transistor Q39. The base of transistor Q40 is connected to a substantially fixed potential level as determined by the position of the variable terminal of resistor 238. Depending upon the magnitude of the signal applied to the base thereof, transistor Q39 may be rendered more or less conductive. For example, a positive signal at the base of transistor Q39 will cause increased current conduction thereby. Because of the differential configuration, Q40 will be effectively "starved" and rendered less conductive. As transistor Q39 is rendered more conductive, the potential at the collector thereof becomes more negative and is applied to the base of transistor Q41. Conversely, as transistor Q40 is effectively starved and rendered less conductive, the potential at the collector thereof becomes more positive and is applied to the base of transistor Q42. These signal conditions tend to cause transistor Q41 to become more conductive while transistor Q42 becomes less conductive. As transistor Q42 becomes less conductive, the current flow through diode 243 and resistor 245 is reduced. The potential drop across these elements is, thus, reduced wherein the potential at the bases of transistors Q43 and Q44 becomes more negative. Clearly, the negative potential tends to render transistor Q43 less conductive while transistor Q44 is rendered more conductive. This conduction by transistor Q44 renders the ptoential at output terminal 28 more negative. The negative signal is applied via resistor 250 and capacitor 182 to the base of transistor 239 at which a positive signal was initially applied. Clearly, this degenerative type feedback tends to reduce the overall gain of the amplifier and render the amplifier more stable.

The opposite condition applies when a negative signal is applied to the base of transistor Q39. Transistor Q39 is rendered less conductive wherein transistor Q40 becomes more conductive. These conduction states cause signals to be applied to transistors Q41 and Q42 wherein transistor Q42 is rendered more conductive while transistor Q41 is rendered less conductive. With transistor Q42 conductive, more current flows therethrough wherein the potential drop across resistor 245 is increased. This potential is applied to the bases of transistors Q43 and Q44, respectively. The more positive potential tends to turn off transistor Q44 while rendering transistor Q43 conductive. With transistor Q43 operative, the current path is from the +22 volt source through resistor 248 and transistor Q43 to the output terminal. Clearly, the output signal is more positive. In addition, this positive signal is returned, via feedback resistor 250 and capacitor 182, to the base of transistor Q39 to which a negative going signal had been applied. Thus, a degenerative feedback operation continues.

Figure 7:
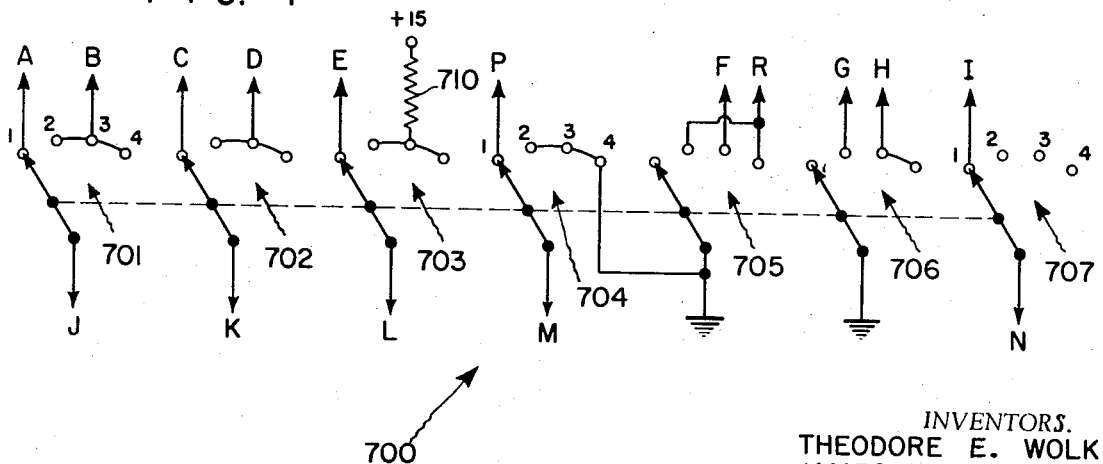

Reference is made concurrently to FIGS. 6 and 7. FIG. 6 is a schematic diagram of the range changing logic circuitry, while FIG. 7 represents a plurality of ganged switches referred to generally as switch 700. The ganged switches (including 7 switches) each include an armature and four contacts. The interconnections of the armature and the contacts with the circuits shown in FIGS. 1 through 6 are indicated by the letter designation at the several contacts. The corresponding connection is indicated by the same letter and designation in the other figures.

In the logic circuit of FIG. 6, gate 19 has an input which is connected to terminal 132 of the ramp integrator 18 (FIG. 3). Gate 19 operates as an inverter and supplies signals through the inverting, toggle input of monostable multivibrator 251. The "0" output of multivibrator 251 is connected to the toggle inputs of flip-flops 267, 268 and 269. The "1" output of multivibrator 251 is connected to one input of gate 255. Gate 255 is a NAND gate which has another input thereof connected to terminal 130 of log converting switch 124 (FIG. 3) via diode 259. Another input of gate 255 is connected to the output of inverter 253. The input of inverter 253 is connected to armature M of switch 700. A filter capacitor 254 is connected between the output of inverter 253 and ground. The output of gate 255 is connected to terminal 131 of switch 124 (FIG. 3). This terminal is further connected to one contact of normally-open reset switch 258 and to the reset side of flip-flop 256. Switch 258 is further connected to ground.

The set side of flip-flop 256 is connected via normally-open start switch 10 to ground and to one input of the inverting input of the reset terminal of monostable multivibrator 261. Another input of multivibrator 261 is connected to armature J of switch 700 via a coupling network comprising the parallel combination of resistor 263 and capacitor 264. A filter capacitor 262 is connected between ground and the second mentioned input to the inverting terminal of multivibrator 261.

The "0" side of flip-flop 261 is connected to the cathode of diode 260 and thence to the dim side of multivibrator 269 and terminal 86 of the ramp integrator (FIG. 2). In addition, the "1" side of flip-flop 261 is connected via diode 252 and inverter 189 to the sweep indicator 188 which is referenced to a +5 volt source. Multivibrator 261 is triggered at the beginning and the end of a sweep cycle. The "1" output of flip-flop 261 is coupled via capacitor 50 and the clamp comprising resistor 48 and diode 49 to the base of transistor Q13. The collector of transistor Q13 is connected to a +15 volt source. The emitter of transistor Q13 is connected via resistor 47 to ground. Capacitor 46 couples the pulse signals from transistor Q13 to the output terminal 45.

Returning to flip-flop 269, the "$C_D$" side thereof is connected to terminal 86 of the ramp integrator (FIG. 2). The toggle input, noted supra, is connected to terminal B of switch 700 and the "0" side of multivibrator 251.

At flip-flop 268, the "1" output side thereof is connected to one input of each of gates 271 and 274. As well, the "1" side is connected to the set input of flip-flop 267 and is returned to the clear input of flip-flop 268. The "0" side of flip-flop 268 is connected to one input of each of gates 270, 272, 273 and 275. As well, the "0" side of flip-flop 268 is connected to a clear input of flip-flop 267 and is returned to the set input of flip-flop 268. The set ($S_D$) and clear ($C_D$) sides of flip-flop 268 are connected to terminals F and R, respectively, of switch 700. In addition, the clear ($C_D$) side is connected to terminal I of switch 700 via diode 266.

The "1" output side of flip-flop 267 is connected to an input of each of gates 272 and 275. The "0" output side of flip-flop 267 is connected to a set input of flip-flop 268. As well, the "0" side of flip-flop 267 is connected to an input of each of gates 270, 271, 273 and 274. The set ($S_D$) side of flip-flop 267 is connected to terminal G of switch 700. The clear ($C_D$) side of flip-flop 267 is connected to a terminal H of switch 700 directly and to terminal I via diode 265. The inputs of flip-flop 267 are previously described. The interconnections of flip-flops 267 and 268, thus, produce a Modulo 3 counter. The counter output signals control gates 270 through 275.

The inputs of gates 270 through 275 are supplied by flip-flops 267 and 268, as noted supra. The outputs of gates 270, 271 and 272 are connected, respectively, to indicator lamps 276, 277 and 278. These lamps are connected to a +5 volt source and represent range indicators 33. Obviously, operation of any of gates 270, 271 or 272 will render the associated indicator light operative.

The output of gate 275 is connected directly to terminal P of switch 700. The outputs of gates 273 and 274 are connected to the cathodes of diodes 279 and 280, respectively. The anodes of the diodes are connected to the base of transistor Q46.

In addition to the cathode of diode 279, the output of gate 273 is connected directly to terminal A of switch 700 and to the base of transistor Q45. The emitters of transistors Q45 and Q46 are connected to ground via resistors 283 and 284, respectively. The emitters are further connected to a +15 volt source via resistors 284 and 286, respectively. This resistor network operates as a dual voltage divider circuit and provides bias potentials at the emitters of transistors Q45 and Q46.

The collector electrodes of transistors Q45 and Q46 are connected to −15 volt sources via resistors 281 and 288, respectively. The collector of transistor Q45 is connected via resistor 282 to the base of transistor Q47. The emitter of transistor Q47 is connected to a −15 volt source. The collector of transistor Q47 is connected to a +15 volt source via resistor 309. The collector of transistor Q47 is further connected to terminal 174 (FIG. 4) via resistor 308. In addition, the collector of transistor Q47 is connected via resistor 306 to the base of transistor Q49. The emitter of transistor Q49 is connected to a −15 volt source while the collector thereof is connected to ground via resistor 307. Variable resistor 305 and series connected resistor 304 connect the collector electrode of transistor Q49 to terminal 128 (FIG. 3).

A parallel and similar circuit includes transistor Q48 which has the base thereof connected via resistor 287 to the collector electrode of transistor Q46. The emitter of transistor Q48 is connected to a −15 volt source. The collector of transistor Q48 is connected to a +15 volt source via resistor 290. Terminal 173 (FIG. 4) via resistor 289 is connected to the collector of transistor Q48. The collector of transistor Q48 is connected via resistor 300 to the base of transistor Q50. The emitter of transistor Q50 is connected to a −15 volt source. The collector of transistor Q51 is connected to ground via resistor 301 and to terminal 128, noted supra, via variable resistor 302 and series connected resistor 303.

The collector electrode of transistor Q48 is further connected directly to terminal E of switch 700. Additionally, the collector of transistor Q48 is connected via resistor 311 to the base of transistor Q51. The collector electrode of transistor Q51 is connected directly to terminal C of switch 700 as well as to a +5 volt source via resistor 310. The emitter electrode of transistor Q51 is connected directly to terminal D of switch 700 and to a common junction of the voltage divider network comprising resistors 313 and 314. The voltage divider is connected between a −15 volt source and ground. Diode 312 is connected between the emitter and base electrodes of transistor Q51 for clamping negative going inputs.

Referring to FIG. 7, there is shown a switch network 700. Switch 700 comprises a plurality of ganged switches 701 through 707, inclusive. Each of the switches includes an armature and four separate contacts. The armatures of switches 705 and 706 are connected directly to ground. The armatures of switches 701 through 704 and 707 are connected to terminals J, K, L, M and N, respectively, as shown in the other drawings. The first contact on each switch is representative of the auto range mode of operation. The remaining three contacts are each associated with one of the frequency ranges of operation of the instrument. For example, contact 4 if associated with the frequency range of 0.1 to 10 Hz. Contact 3 is associated with the 10 Hz.–1 kHz. range while contact 2 is associated with the 1–100 kHz. frequency range.

On switches 705 and 706, the auto range contact is disconnected. On switches 701 through 704 and 707, the auto range contact (contact 1) is connected to terminals A, C, E, P and I, respectively. At switch 701, contacts 2, and 3 and 4 are connected together and with terminal B. At switch 702, contacts 2, 3 and 4 are connected together and to terminal D. At switch 703, contacts 2, 3 and 4 are connected together and, via resistor 701, to a +15 volt source. At switch 704, contacts 2, 3 and 4 are connected together and to ground. At switch 705, contacts 2 and 4 are connected together and to terminal R. Contact 3 of switch 705 is connected directly to terminal F. At switch 706, contact 2 is connected directly to terminal G while contacts 3 and 4 are connected together and to terminal H. At switch 707, contacts 2, 3 and 4 are disconnected.

Since switches 701 through 707 are ganged and operated concurrently, for example as a deck switch, the operation of the circuit is controlled thereby. Thus, selected interconnections are achieved for the auto range mode and the individual frequency ranges. The effect of the positioning of the individual sections of switch 700 is described hereinafter.

In operation, a start signal is supplied by closing start switch 10. The start signal is applied to the set input, $S_D$, of flip-flop 256 thereby causing a "1" signal to be provided thereby. The "1" signal, which is a positive signal, is applied to inverter 189 such that a low level signal is supplied thereby. Thus, sweep indicator 188 is rendered conductive.

In addition, the high level "1" signal produced by flip-flop 256 is applied to terminal N of switch 700. The start signal supplied via switch 10 is also applied to the input of multivibrator 261. The output of multivibrator 261 connected to diode 260 is momentarily zero thus making the anode junction of diodes 260 and 252 zero. Thus, a momentary delay controlled by multivibrator 261, is provided before the "1" signal is applied to terminal 86. The signal which is applied to terminal N to the cathodes of diodes 265 and 266 is supplied via contact I when switch 707 is in the auto range position. When the signal applied to the cathodes is high, diodes 265 and 266 are nonconductive. When switch 700 is in any of the individual ranges, terminal N is disconnected.

It is assumed that the switch 700 is in the auto range condition. Consequently, after the momentary delay produced by multivibrator 261, the positive signal supplied by the "1" side of flip-flop 256 is applied to terminal 86 of the ramp integrating circuit. This signal controls the lower limit circuit of the integrating circuit as noted supra. In addition, the start output circuitry 87 (FIG. 2) is activated whereby a signal is applied at terminal 45. Additionally, diodes 265 and 266 are rendered nonconductive by the signal supplied by means of the connection at switch 707. Moreover, diode 252 is rendered nonconductive and the clear C_D input terminal of flip-flop 269 is disconnected.

When the signal is supplied to terminal 86, the ramp integrator is conditioned for operation and produces an output signal. The ramp integrator circuit operates as described supra to produce a signal at terminal 60. This signal is supplied to the log converting circuit (FIG. 3) and, specifically, to a contact of switch 125. This signal is selectively applied to the log converter network as described supra. As well, the signal is selectively applied to the current sources 22 and 23 via terminal 129 and to ramp output amplifier 109. As well, the signal supplied from the ramp integrator is selectively applied to an input of amplifier 110 which, as described supra, provides a signal at control gate 19. With the application of the signal at terminal 132, gate 19 is rendered operative and acts as an inverter.

When multivibrator 251 receives a signal from gate 19, a positive signal is provided at the "0" side thereof. This signal is applied to contact B of switch 70. Inasmuch as switch 700 is initially assumed to be in the auto range position, contact B is disconnected. Additionally the "0" signal from monostable multivibrator 251 is connected to the toggle input of flip-flop 269. Since the clear C_D side of this flip-flop is clamped by flip-flop 256, a toggle input causes flip-flop 269 to change states. When flip-flop 269 changes states, the signal at terminal 85 operates, as noted, in the description of FIG. 2, to alter the capacitor range changing circuitry in the ramp integrating circuit.

Concurrently, the "0" signal from multivibrator 251 is applied to the toggle input of flip-flops 267 and 268 which are connected to operate as a Modulo 3 counter. That is, the Modulo 3 counter will produce output signals which are used by the circuit. The outputs count the signal ranges which are utilized. For example, signals will be supplied to the toggle input of flip-flop 268 to initiate the counting. These signals are produced by the aforementioned circuitry and indicate the beginning or the end of an individual range. It is assumed initially, that the zero output side of flip-flops 267 and 268 exhibit high (for example ±5 volts) signals. Obviously, the zero output signals produce low (for example zero volt) signals. These output signals are interconnected with the inputs of the other flip-flops as noted supra. In operation, the application of the signal to the toggle input of flip-flop 268 tends to produce a high signal on that output side of the flip-flop which is associated with a high signal at the associated input. Thus, the set input side (S_D) of lip-flop 268 has a high signal applied thereto from the "0" output side thereof as well as from the "0" output side of flip-flop 267. Conversely the clear input side (C_D) of flip-flop 268 has a low signal side of flip-flop 267. Consequently, a toggle signal at toggle input terminal (T) causes flip-flop 268 to switch states such that the "0" output terminal exhibits a low signal and the "1" output terminal exhibits a high signal.

The set terminal of flip-flop 267, as well as the clear terminal of flip-flop 268, each receive a high signal from the "1" output of flip-flop 268. Thus, although the toggle signal is supplied to the T input terminal of flip-flop 267 simultaneously with the T input of flip-flop 268, flip-flop 267 is not switched inasmuch as the set terminal receives a low signal and the "1" output signal is a low signal before 268 is switched.

With the application of the second toggle signal, the clear input of flip-flop 268 and the set input of flip-flop 267 receive high signals. Conversely, the set input of flip-flop 268 and the clear input of flip-flop 267 receive low signals. Thus, the second toggle signal causes both the flip-flops 267 and 268 to change states. Consequently, the "0" and "1" output of flip-flop 268 are high and low signals, respectively. Moreover, the "1" and "0" outputs of flip-flop 267 are high and low signals, respectively. Thus, the set input of flip-flop 268 receives a high input from the "0" output of flip-flop 268 and a low input from the "0" output of flip-flop 267. Concurrently, the clear input of flip-flop 268 is a high signal. On the other hand, the set and clear input signals of flip-flop 267 are low and high signals supplied by the outputs of flip-flop 268, respectively. Therefore, with the third toggle signal, flip-flop 268 does not switch states. However, flip-flop 267 switches states inasmuch as the set input receives a low signal and the toggle forces the flip-flop to this condition. Contrariwise, since the low level signal is the "forcing" signal, flip-flop 268 has substantially, zero signals at both inputs and is effectively forced to remain status quo.

The foregoing signal conditions are shown in the following truth table:

| | | 268 | | 269 | |
|---|---|---|---|---|---|
| Toggle | Range | 1 | 0 | 1 | 0 |
| Initial | Low | − | + | − | + |
| First | Mid | + | − | − | + |
| Second | High | − | + | + | − |
| Third | Low | − | + | − | + |

It is seen that subsequent to the third toggle input, the counter output conditions are the same as the initial conditions. Thus, three "counts" are required to return the counter to the initial condition.

The signals supplied by the counter are provided to the inputs of gates 270 through 275. It is seen that gates 270, 271 and 272 are identically connected, at the inputs thereof, as gates 273, 274 and 275, respectively. In fact, one of the sensing gates may be eliminated by directly driving the associated indicators 33 provided sufficient drive power is available. Each of the gates is a NAND gate which requires two high input signals to produce a low output signal. Thus, at the start of the operation, it is seen that gates 270 and 273 receive high signals from the "0" sides of flip-flops 267 and 268, respectively. On the other hand, gates 271 and 274 each receive a low input signal from the "1" side of flip-flop 268 while gates 272 and 275 each receive a low signal from the "1" output side of flip-flop 267. Consequently, gates 270 and 273 produce low output signals such that indicator 276 is operated and diode 279 is forward biased. Additionally, the low signal produced by gate 273 is applied directly to contact A of switch 701 and to the base of transistor Q45 to render this transistor conductive. On the other hand, gates 271, 272, 274 and 275 produce high output signals whereby indicators 277 and 278 are not operated, diode 280 is rendered nonconductive and a high signal is supplied to contact P of switch 704.

Upon receipt of the first toggle signal, the states of flip-flops 268 and 267 are changed. Consequently, the supplied to the gates are also changed. A review of these signals will show that gates 271 and 274 now receive two high signals and are rendered operative to produce a low output signal. All of the other gates receive at least one low input signal and thus, produce high output signals. The low output signal at gate 271 renders indicator lamp 277 operative. The low output signal at gate 274 renders diode 280 operative and, in conjunction with the high signal produced at gate 273, renders diode 279 inoperative. Conduction by diode 280 causes transistor Q46 to be turned on because of the application of a low signal at the base thereof. On the contrary, the high signal produced by gate 273 is applied to the base of transistor Q45 thereby turning this transistor off.

The next toggle signal causes the Modulo 3 counter to advance another count. The signals applied to the gates cause gates 272 and 275 to be operative and produce low output signals. Gate 272 causes indicator 278 to operate while gate 275 supplies a low signal to terminal P of switch 704.

It is noted that the signal channels comprising transistors Q45, Q47 and Q49 in one channel and transistors Q46, Q48 and Q50 in a second channel are substantially identical channels. These channels are connected together at terminal 128 which is returned to the input of amplifier 109 via switch 127 when the system is operating in the LOG ramp voltage mode. The aforegoing description indicates that operation of gate 273 renders both channels operative inasmuch as low signal is applied directly to the base of transistor Q45 and, via diode 279, to base of transistor Q46. When both channels are operative, the output signal at terminal 128 is substantially ground level. Operation of gate 274 causes only one of the channels to be rendered operative. That is, a negative signal is supplied to the base of transistor Q46 via diode 280. This negative signal is also applied to the anode of diode 279 while a positive signal is applied to the cathode thereof. Additionally, the positive signal from gate 273 is applied to the base of transistor Q45 rendering this transistor non-conductive. When transistor Q45 is turned off, it will be noted that a relatively negative signal is supplied to terminal 128 via the first channel. However, the second channel is maintained in the conductive condition and supplies a relatively positive signal across terminal 128. The signals are summed and the net current, in the illustrative embodiment will produce a voltage on the order of +3.33 volts to terminal 17 (FIG. 1).

When gate 275 is operative, both channels are disconnected inasmuch as gates 273 and 274 both supply positive signals. The positive signals are supplied directly to the base of transistor Q45 and, as well, render diodes 279 and 280 non-conductive. Transistors Q45 and Q46 are rendered inoperative by the positive signals. Consequently, the output transistors Q49 and Q50 each supply relatively negative current to terminal 128. Again, the negative signals are summed and provide a potential at terminal 17 in the illustrated embodiment, on the order of +6.67 volts.

The input currents at terminal 128 are supplied to amplifier 105 as noted. Consequently, in the first range of operation by the integrating amplifier 42 substantially no input is supplied to the inverting inputs of amplifier 10 via switch 127. In the second range of operation by the integrating amplifier, an identical signal is produced thereby. However, the pedestal or offset current supplied to terminal 128 is equivalent to the signal produced at the output of amplifier 123 after a full range excursion of the signals supplied by integrating amplifier 42. Thus, in the second range, integrator amplifier 42 supplies a signal which is identical to the first range signal to the input of amplifier 123. However, the aforesaid single range pedestal current at terminal 128 is summed with the output of amplifier 123 such that the output of amplifier 109 appears relatively continuous. Similar operation occurs for the third range of the circuit with the pedestal current which is supplied to amplifier 109 having a magnitude equal to twice the excursion of the output signal supplied by amplifier 123.

When the Modulo 3 counter has counted two toggle signals, gate 275 produces a low signal which is applied to terminal P of switch 704. If the system is operating in an individual range mode, terminal P is not connected. However, if the system is operating in the auto-range mode, armature M is connected to contact P. Thus, the low signal is supplied from terminal P to terminal M which is an input of inverter 253. Inverter 253 supplies a positive signal to NAND gate 255. Under proper conditions, the enabling signal supplied by inverter 253 will cause NAND gate 255 to produce a low level signal which is applied to the reset side of flip-flop 256. As will be seen, this operation is meaningful only in the single mode. That is, referring to switch 124 in FIG. 3, terminal 131, i.e. the output of gate 255, is connected to ground in the MANUAL, LOWER LIMIT and UPPER LIMIT modes. Input terminal 130, which is connected to gate 255, is grounded during the REPEAT operation. Consequently, a disabling signal is always applied to an input of gate 255 during the REPEAT type operation such that ground potential cannot be supplied to the reset input side of flip-flop 256.

During the Single mode of operation, a three stage output signal will be generated as described supra. A signal will be generated by gate 275 in accordance with the third count of the Modulo 3 counter. The signal generated by gate 275 is supplied via terminal P to terminal M. This low signal is inverted by inverter 253 and applied as a high level signal to one input of gate 255. Terminal 130 is not clamped to ground since, in the simple mode operation, the appropriate contact of switch 124 is connected via resistor 259 to the upper limit control circuit. Thus, when a high signal is generated by the "1" side of monostable multivibrator 251, gate 255 produces a low level signal which causes flip-flop 256 to be reset. The signal which is generated by the "1" side of monostable multivibrator 251 is generated by the application of a signal from ramp integrator 42 at terminal 132. The signal supplied at terminal 132 is a positive signal when the ramp integrator has achieved a predetermined value. Thus, when the predetermined level, for example the upper limit, is reached, flip-flop 256 is reset and circuit operation terminates.

Referring now to switch 701 of FIG. 7, the armature J is connected to the clear input of monostable multivibrator 261. The armature J is connected to terminal A in the automatic mode of operation and to terminal B in any of the range modes of operation. In the automatic mode, the signal at terminal A is supplied by gate 273. Thus, a low signal is supplied to the input of monostable multivibrator 261 only during the first range of operation indicated by the Modulo 3 counter. During the other ranges, gate 273 supplies a high signal to monostable multivibrator 261. The low signal is effective to trigger multivibrator 261 such that a low signal is applied at the cathode of diode 260. In the case of the high inputs supplied by gates 273, multivibrator 261 is not triggered.

In the individual range modes, the signal supplied to the clear input of multivibrator 261 via armature J is applied by the "1" output side of multivibrator 251 via contact B. Since, in the individual range mode monostable multivibrator 251 is switched after each range, a trigger signal is supplied to multivibrator 261 at the termination of the range signal. Thus, in effect, single range operation is permitted in the range mode while three ranges of operation are permitted in auto-mode operation.

At switch 702, the armature K is connected to the base of transistor Q19 (see FIG. 3) via resistor 111. Transistor Q19 is the control element for the Upper Limit Control Circuit. Armature K is connected to contact C in the auto range and to contact D in any of the individual ranges of operation. As noted supra, terminals C and D are connected to the collector and emitter electrodes respectively of transistor Q51. The signal at terminal C, i.e. the collector of transistor Q51, is a high signal wherever the second channel of the pedestal voltage circuit is operative. Since the second channel is operative during each of the first two ranges in the auto range mode of operation, transistor Q19 is rendered nonconductive and the Upper Limit Control is not effected during the lower two ranges. However, in the third range of operation the two pedestal voltage channels are turned off and transistor Q51 is rendered conductive. Thus, the signal at contact C becomes a relatively low signal whereby transistor Q19 is turned on. As noted, when transistor Q19 is turned on a reference potential is supplied to the inverting terminal of amplifier 110.

Contact D is connected to the emitted electrode of transistor Q51. The potential at contact D is relatively low and renders transistor Q19 operative during each of the individual ranges. Thus, transistor Q19 can be turned off only when transistor Q51 changes state. However, in the individual range of the Modulo 3 counter does not control whereby the signal at terminal D is never switched high. Consequently, the Upper Limit Control supplied via transistor Q19 is always effective.

The armature L of switch 703 is connected to the base of transistor Q18 which is the control element on the programmable upper limit circuit. In the auto range mode of operation, armature L is connected to terminal E which is supplied by the signal at the collector electrode of transistor Q48 in the second channel of the pedestal voltage circuit. In the range mode of operation, armature L is connected to a +15 volt source via resistor 710. Consequently, in the range mode of operation a relatively positive potential is always supplied at the base of transistor Q18 thereby disconnecting the programmable upper limit circuit.

The signal detected at contact E is identical to the signal supplied to the base of transistor Q51. Because of the connections of transistor Q51, the signal conditions at terminals C and E are opposite. Consequently, the signal level at contact E is relatively negative when the pedestal voltage circuits are operative and relatively positive when the second channel of the pedestal voltage circuit is inoperative. Thus, a relatively high signal is applied to the base of transistor Q18 via terminal E to render the programmable upper limit circuit inoperative when the circuit is in the third range of operation during the auto range mode.

As noted, at switch 704, the input of inverter 253 is connected via armature M to the output of gate 275 via contact P in the auto mode of operation such that flip-flop 256 may be reset at the end of the third range. Conversely, during the individual range mode of operation, input terminal M of inverter 253 is connected to ground thereby applying a positive enabling signal at NAND gate 255.

At switches 705 and 706, the auto range contact is disconnected and has no effect on the circuit operation during the auto range mode of operation. However, in the individual range modes of operation, contact R is connected to the anode of diode 266 and to the $C_D$ clear input of flip-flop 268. Each of these connections is grounded such that diode 266 is rendered nonconductive and the clear input of flip-flop 268 is clamped to ground to inhibit operation of the Modulo 3 counter during an individual range operation.

At switch 706, contact G is connected to the $S_D$ set input of flip-flop 267 while contact H is connected to the $C_D$ clear side of 267 as well as the anode of diode 265. With this circuit configuration, the set side of flip-flop 267 is clamped to ground during the high range of operation while the clear side of flip-flop 267 is clamped to ground during the lower two ranges.

Referring now to switch 707, contact I is connected to the common junction of cathodes of diodes 265 and 266. Armature N is connected to the cathode of diode 252. Thus, in the auto mode of operation, the signal supplied by flip-flop 256 is applied to the cathodes of diodes 265 and 266 via diode 252. Initially, it is considered that the signal supplied by the "1" side of flip-flop 256 is a relatively low signal until a start signal is applied and a monostable multivibrator 261 has been triggered and rendered operative. Thus, diodes 265 and 266 are forward biased and clamp the clear sides of flip-flop 267 and 268 at a low signal. Contrariwise, when flip-flop 256 has been set and the "1" side thereof is a high signal (which is no longer clamped by multivibrator 261), the high signal is applied to the cathodes of diodes 265 and 266. This high signal renders the diodes inoperative and removes the clamping effect of the clear side of flip-flop 267 and 268. Consequently, these input terminals are now controlled by the signals applied at terminals F and H, respectively, as noted supra.

Figure 8:
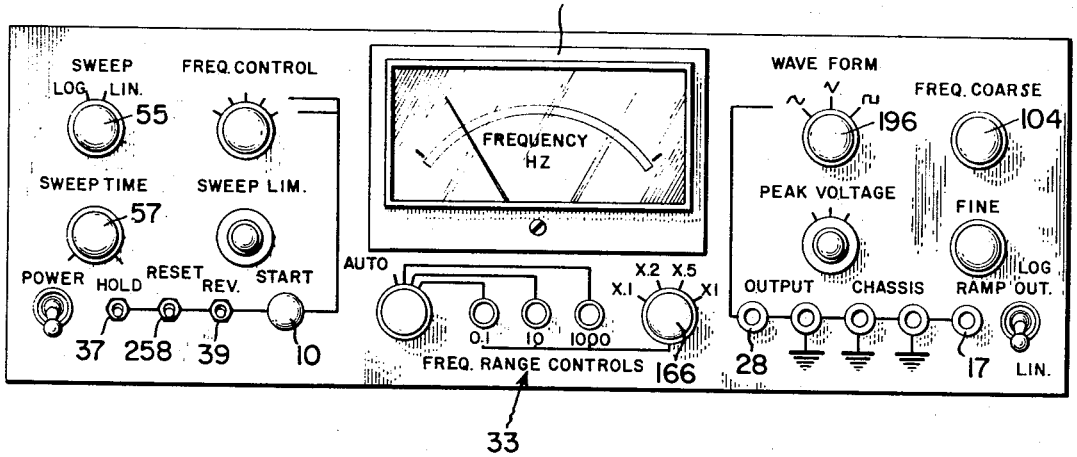
FIG. 8 is a front view of a typical panel configuration for the invention.

FIG. 8 is a diagrammatic showing of the front panel of the instrument housing. The panel is useful in describing the operation of the circuit. Therefore, components which are similar bear similar reference numerals. The circuit operates as a signal generator which can supply a triangular wave, a square wave or a sinusoidal wave. The individual components for inverting and producing these signals are described supra. Each of the signals is effectively controlled by a ramp generator, the time constant which may be varied by means of appropriate settings of control 57. Moreover, the time constant for each range and the designation of which of the plurality of ranges (or all of said ranges to be utilized) is also controlled by appropriately setting switch 700. Further, switches 700 are used to determine whether a signal supplied by the ramp generator is to be a linearly varying signal or a logarithmically varying signal. This circuit provides a very desirable test instrument which may be utilized to provide the waveforms noted with the accurately controlled pulse duration and mathematical function for operation thereof.

Thus, an input signal may be supplied to the circuit to generate a ramp signal of either linear or logarithmic variation. The duration of the ramp signal is easily controlled. The signal produced by the ramp generator is operated upon to give a useful signal. The signals are further operated upon to generate triangular waves which are converted to square or sinusoidal waveforms. The ramp signal may be controlled to operate over one or a plurality of frequency ranges which permit a one million to one frequency range. Suitable logic controls are provided to control each of these functions such that automatic operation is achieved in any one or more of the individual ranges noted. The signal generated is detected upon a suitable indicating device 16 and provision is made for stopping the indication (switch 37), reversing the operation of the circuit (switch 39) and following same on indicator 16, starting the operation in any of the individual frequency ranges and stopping the operation in the same or any of the higher frequency ranges by means of the limit control 166.

A preferred embodiment of the invention has been disclosed. It is understood that changes may be incorporated in any of the individual components, networks, or circuits. However, any changes which are within the inventive concepts described hereinabove, are intended to be included within this description.

The embodiments of the invention in which an exclusive property or privilege is claimed are defined as follows:

1. A function generator comprising input means, range changing means connected to said input means, integrating means connected to said range changing means to receive signals therefrom, function generating means connected to said integrating means to receive signals therefrom, said integrating means including amplifier means, switching means connected in parallel with said amplifier means, said switching means selectively altering the gain of said amplifier as a function of the condition of the switching means, said switching means being connected to said range changing means to have the condition thereof controlled thereby, and mode control means connected to the inputs of said amplifier means, said mode control means including switches for selectively connecting the inputs of said amplifier means to alternative sources.

2. A function generator comprising input means, range changing means connected to said input means, integrating means connected to said range changing means to receive signals therefrom, function generating means connected to said integrating means to receive signals therefrom, signal converter means connected to receive signals from said integrating means and operative to alter the form of the signals produced by said integrating means, said signal converter means producing a logarithmically varying signal, said converter means including amplifier means, a pair of opposite conductivity type semiconductors connected together and in parallel with said amplifier means, separate bias means connected to each of said semiconductors, at least one of said bias means including a temperature responsive device therein to compensate for temperature variations, switch means connected between the integrating means and the input of said amplifier means, limit means connected to said switch means, said switch means selectively controlling the operation of said function generator, and output means connected to said amplifier means.

3. A function generator comprising input means, range changing means connected to said input means, integrating means connected to said range changing means to receive signals therefrom, function generating means connected to said integrating means to receive signals therefrom, signal comparing means connected between said integrating means and said range changing means such that the operating range of the function generator is automatically changed as a function of the level of the signal produced by said integrating means, said signal comparing means including amplifier means, means connected in parallel therewith for selectively changing the operating characteristics of said amplifier means, and means connected to said range changing means to receive signals therefrom, said last named means being operative to control the means connected in parallel with the amplifier means as a function of the condition of the range changing means.

4. A function generator comprising input means, range changing means connected to said input means, integrating means connected to said range changing means to receive signals therefrom, function generating means connected to said integrating means to receive signals therefrom, said function generating means including triangle wave generator means, upper and lower level sources connected to the input of said triangle wave generator means, sine wave converter means connected to said triangle wave generator means in order to produce a sine wave signal in response to a triangle wave signal, square wave signal generator means connected to said triangle wave generator means in order to produce a square wave signal in response to a triangle wave signal, said triangle generator means including amplifier means, selectively operated switch means connected in parallel with said amplifier means, said switch means being connected to said range changing means and controlled thereby, output means connected to the output of said amplifier means, input means connected to the input of said amplifier means to supply a signal from said integrating means, said output means being connected to said input means to control the operation thereof, and syne output means connected to said output means to produce output signals synchronized with the operation of said triangle generator means.

5. The function generator recited in claim 4 wherein said input means includes first and second current source means, said second current source means operative to supply a current having twice the magnitude and opposite polarity relative to the current supplied by said first source, said first current source connected directly to the input of said amplifier means, switch means connected between said second current source and the input of said amplifier means, said output means including comparator means, said comparator means connected to said switch means to control the operation thereof, said comparator means selectively producing a control signal to operate said switch means at predetermined output signal levels such that the current signal supplied to said amplifier changes sign but not magnitude wherein the output signal levels are determined.

6. A function generator comprising input means, range changing means connected to said input means, integrating means connected to said range changing means to receive signals therefrom, function generating means connected to said integrating means to receive signals therefrom, said range changing means including counter means, said counter means including a plurality of gate circuits, said gate circuits being operative to produce output signals indicative of predetermined counts, signal conditioning circuit means connected to at least some of said gate circuits to receive output signals produced thereby, said signal conditioning circuits supplying signals indicative of a range change, and reset means connected to one of said gate circuits to reset the operation of the range changing means when energized by a signal from the associated gate circuit.

7. A function generator comprising input means, range changing means connected to said input means, integrating means connected to said range changing means to receive signals therefrom, function generating means connected to said integrating means to receive signals therefrom, said range changing means including first multivibrator means, input means connected to said first multivibrator means to control the operation thereof, second multivibrator means connected to said input means to be controlled thereby, means connecting the output of said first multivibrator means with an input of said second multivibrator means to provide a temporary control signal thereto, said first multivibrator means further supplying signals to said integrating means to affect operation thereof, third multivibrator means connected to the output of said first multivibrator means and controlled thereby, said third multivibrator supplying signals to said integrating means to change an operating characteristic thereof, gate means for receiving signals indicative of the operating characteristics of said integrating means, fourth multivibrator means connected to said gate means to receive signals therefrom, switching circuit means connected to receive signals from said gate means, said switching circuit means producing different output signals in a repetitive pattern in response to successive signals from said gate means, and means connecting said switching circuit means to said first multivibrator means in order to reset said first multivibrator means in response to a condition represented by said repetitive pattern of output signals.

8. A function generator comprising input means, range changing means connected to said input means, integrating means connected to said range changing means to receive signals therefrom, function generating means connected to said integrating means to receive signals therefrom, control means connected to said integrating means to control the operation thereof, said integrating means providing a ramp type output signal, said control means including plurality of sources which are selectively connected to the inputs of said integrating means, said sources supplying different signals so that said integrating means operates in the linear or logarithmic mode alternatively, means for connecting the output of said integrating means to the inputs thereof such that reverse operation of the integrating means occurs, and means for maintaining the integrating means as a particular operating condition.

References Cited
UNITED STATES PATENTS

| | | | |
|---|---|---|---|
| 3,206,673 | 9/1965 | Hooker et al. | 331—61 X |
| 3,243,803 | 3/1966 | Thue | 307—229 X |
| 3,349,257 | 10/1967 | Thomas et al. | 307—228 X |
| 3,386,039 | 5/1968 | Navie | 307—261 X |
| 3,422,372 | 1/1969 | Post et al. | 307—228 X |
| 3,452,285 | 6/1969 | Parmett | 307—229 X |

OTHER REFERENCES

Pub. I: "Improved Performance From the Unit Pulse Generator," in The General Radio Experimeter, vol. 38, No. 12, December 1964, pp. 3 to 8.

STANLEY D. MILLER, Primary Examiner

U.S. Cl. X.R.

307—228, 260, 261; 328—59, 127, 142, 181; 331—61